US009995432B1

(12) United States Patent
Girault

(10) Patent No.: US 9,995,432 B1
(45) Date of Patent: Jun. 12, 2018

(54) PORTABLE COMPUTING TABLET HOLSTER

(71) Applicant: Dimitri Girault, Miramar, FL (US)

(72) Inventor: Dimitri Girault, Miramar, FL (US)

( * ) Notice: Subject to any disclaimer, the term of this patent is extended or adjusted under 35 U.S.C. 154(b) by 0 days. days.

(21) Appl. No.: 15/207,480

(22) Filed: Jul. 11, 2016

Related U.S. Application Data

(63) Continuation-in-part of application No. 14/044,038, filed on Oct. 2, 2013, now Pat. No. 9,388,939.

(60) Provisional application No. 61/709,298, filed on Oct. 3, 2012.

(51) Int. Cl.
| | |
|---|---|
| *F16M 13/04* | (2006.01) |
| *F21V 33/00* | (2006.01) |
| *G06F 1/16* | (2006.01) |
| *A45F 5/00* | (2006.01) |
| *F16M 11/04* | (2006.01) |
| *F16M 11/10* | (2006.01) |
| *F16M 11/20* | (2006.01) |
| *A45F 5/02* | (2006.01) |

(52) U.S. Cl.
CPC .............. *F16M 13/04* (2013.01); *A45F 5/00* (2013.01); *F16M 11/041* (2013.01); *F16M 11/105* (2013.01); *F16M 11/2021* (2013.01); *F21V 33/0004* (2013.01); *G06F 1/1626* (2013.01); *G06F 1/1628* (2013.01); *G06F 1/1686* (2013.01); *A45F 2005/006* (2013.01); *A45F 2005/025* (2013.01)

(58) Field of Classification Search
CPC ........ A45F 2005/006; A45F 2200/0525; A45F 5/00; F16M 11/041; F16M 13/04; G06F 1/1632; G06F 1/1626; G06F 1/1628; G06F 1/1686
See application file for complete search history.

(56) References Cited

U.S. PATENT DOCUMENTS

| | | |
|---|---|---|
| 5,081,478 A | 1/1992 | Hayashida et al. |
| 6,773,110 B1 | 8/2004 | Gale |
| 7,563,038 B2 | 7/2009 | Hershenzon |
| 7,877,841 B2 | 2/2011 | Mangaroo et al. |
| 7,907,394 B2 | 3/2011 | Richardson et al. |
| 7,976,227 B2 | 7/2011 | Orf et al. |
| 8,091,850 B2 | 1/2012 | Carnevali |

(Continued)

*Primary Examiner* — James Wu
*Assistant Examiner* — Michael Matey
(74) *Attorney, Agent, or Firm* — Allen D. Hertz, P.A.; Allen D. Hertz

(57) ABSTRACT

A portable computing tablet holster comprising a handle assembly attached to a portable computing tablet retention assembly. The portable computing tablet retention assembly is adapted to retain a portable computing tablet therein using a pair of elongated retention channels extending along opposite elongated edges of a tablet rear support panel. The tablet is retained by a lateral retention channel extending along a lateral edge and at least one flexible retention element located proximate an opposite lateral edge thereof. The handle assembly can be rigidly fixed to the rear panel or moveably assembled to the rear panel. Movement between the handle and the rear panel can include a sliding movement, a rotating movement, and/or a pivoting movement. A user input device can be integrated into the handle for controlling at least one of a light and/or a camera integrated into the holster, the tablet, and the like.

23 Claims, 26 Drawing Sheets

(56) References Cited

U.S. PATENT DOCUMENTS

| | | | |
|---|---|---|---|
| 8,138,869 B1 | 3/2012 | Lauder et al. | |
| 8,638,557 B2 * | 1/2014 | Tsai | F16M 11/041 248/919 |
| 8,770,539 B1 * | 7/2014 | Hsu | B60R 11/0241 248/126 |
| 8,885,338 B1 * | 11/2014 | Simpson | A45F 5/10 224/929 |
| 9,450,634 B2 | 9/2016 | Rayner | G06F 1/163 |
| 2003/0029985 A1 | 2/2003 | Zeller et al. | |
| 2004/0026590 A1 | 2/2004 | Lin | |
| 2005/0196999 A1 * | 9/2005 | Chang | B60R 11/0241 439/345 |
| 2007/0090638 A1 | 4/2007 | Severi Rivera | |
| 2010/0195278 A1 | 8/2010 | Wilkenfeld | |
| 2010/0214470 A1 | 8/2010 | Cottagnoud | |
| 2011/0031287 A1 | 2/2011 | Le Gette et al. | |
| 2011/0164173 A1 * | 7/2011 | Orf | H04N 5/2252 348/376 |
| 2011/0170851 A1 * | 7/2011 | Orf | F16M 11/041 396/421 |
| 2011/0221319 A1 | 9/2011 | Law et al. | |
| 2011/0240830 A1 | 10/2011 | Alemozafar et al. | |
| 2011/0249964 A1 | 10/2011 | Wood | |
| 2011/0290975 A1 | 12/2011 | Lin | |
| 2011/0315733 A1 | 12/2011 | White | |
| 2012/0037771 A1 | 2/2012 | Kitchen | |
| 2012/0068043 A1 | 3/2012 | Daigle et al. | |
| 2012/0075799 A1 | 3/2012 | Pollex | |
| 2012/0113572 A1 * | 5/2012 | Gaddis, II | G06F 1/1628 361/679.01 |
| 2013/0001382 A1 * | 1/2013 | Jang | A45F 5/10 248/176.1 |
| 2013/0005401 A1 * | 1/2013 | Rosenhan | G06F 1/1626 455/557 |
| 2013/0105644 A1 * | 5/2013 | Yu | G10G 5/005 248/125.7 |
| 2013/0126688 A1 | 5/2013 | Li | |
| 2013/0148273 A1 * | 6/2013 | Tsai | F16M 11/041 361/679.01 |
| 2013/0161967 A1 * | 6/2013 | Jarrett | F16M 11/041 294/142 |
| 2014/0124644 A1 * | 5/2014 | Wong | E05B 73/0082 248/553 |
| 2014/0166832 A1 * | 6/2014 | Briant | F16M 11/041 248/205.1 |
| 2014/0233180 A1 * | 8/2014 | Vargas | G06F 1/1632 361/679.55 |
| 2015/0009672 A1 * | 1/2015 | Girault | G06F 1/1632 362/253 |
| 2015/0192956 A1 * | 7/2015 | Whorton | C07D 493/04 361/679.43 |
| 2015/0244126 A1 * | 8/2015 | Carnevali | G06F 1/1628 439/527 |
| 2015/0292669 A1 * | 10/2015 | Floersch | G06F 1/1626 248/553 |
| 2015/0300050 A1 * | 10/2015 | Van Balen | A47F 7/0246 248/551 |
| 2015/0313026 A1 * | 10/2015 | Yu | G06F 1/1626 248/285.1 |
| 2015/0319285 A1 * | 11/2015 | Zajeski | H04M 1/7253 455/419 |
| 2015/0365121 A1 * | 12/2015 | Smith | H04B 1/3877 455/575.8 |

* cited by examiner

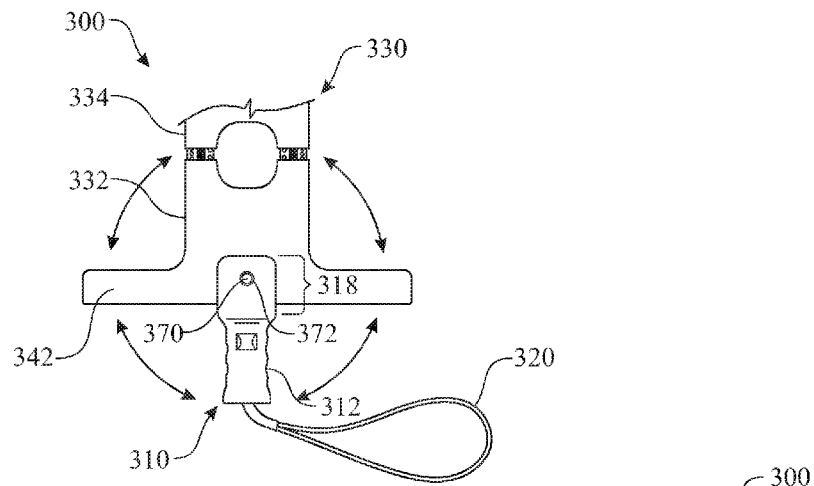
FIG. 6A
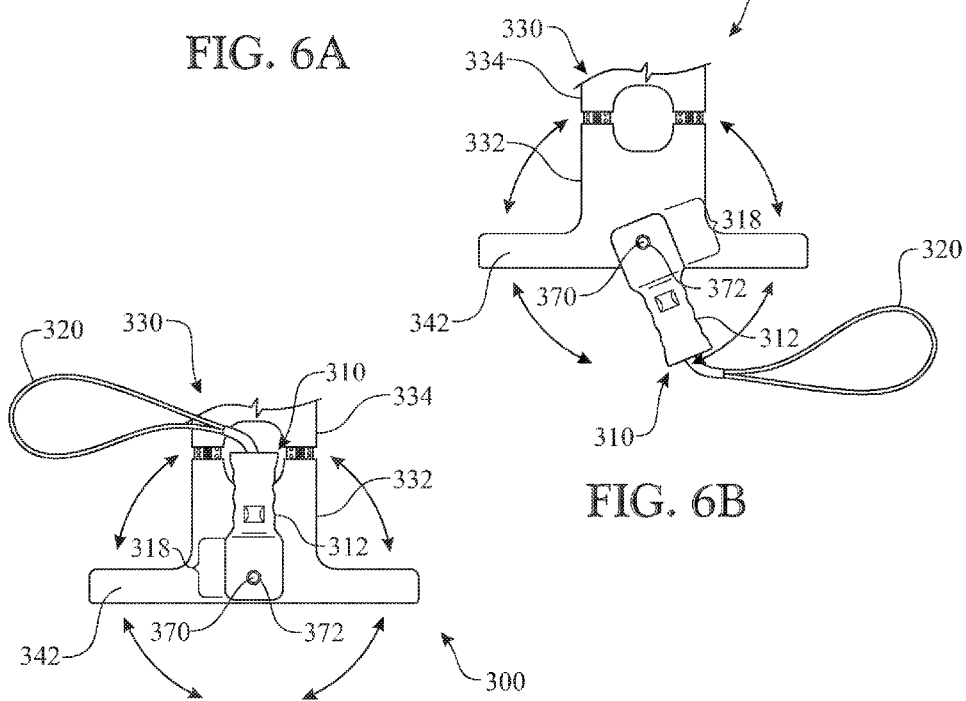
FIG. 6B
FIG. 6C

PORTABLE COMPUTING TABLET HOLSTER

CROSS-REFERENCE TO RELATED APPLICATION

This Non-Provisional Utility Application (NPPA) is a Continuation-In-Part (CIP), which claims the benefit of United States Non-Provisional Patent Application (NPPA) Ser. No. 14/044,038, filed on Oct. 2, 2013 (scheduled to issue as U.S. Pat. No. 9,388,939 on Jul. 12, 2016), which is a Non-Provisional Patent Application (NPPA) claiming the benefit of U.S. Provisional Patent Application Ser. No. 61/709,298, filed on Oct. 3, 2012, all of which are incorporated herein in their entireties.

FIELD OF THE INVENTION

The present disclosure relates to an apparatus for supporting a portable computing tablet. More particularly, the present disclosure relates to a portable computing tablet holder, which allows a user to adequately hold the portable computing tablet using a single or to additionally increase stability when supporting the portable computing tablet using two hands.

BACKGROUND OF THE INVENTION

The present invention provides a portable computing tablet holster. Various portable computing tablet holsters are known in the art for use in supporting a portable computing tablet relative to a fixed surface such as, for example, table tops, automotive dash boards or seats, etc.

Cases are common place for protection of portable computing tablets. The cases include features which support the portable computing tablets when placed upon a supporting surface, such as a table, a chair, a countertop, and the like. Some cases include a strap extending across a rear panel of the case, enabling single handed support for the user. This configuration tends to be cumbersome or unusable when using the portable computing device to capture or record images and/or video.

One drawback with the currently available technology is the ability to support the portable computing tablet using a single hand. For example, it is very difficult to hold a portable computing tablet using a single hand when capturing video images while operating the multi-media device freehand. Owners of portable computing tablets use the portable computing tablets to capture video images during events at any of a variety of venues. Portable computing tablets are commonly rectangular in shape and lack handles, grooves, grips or any other provision to enhance a grasp thereof, wherein any of these features would be beneficial to the user while capturing video images. The smooth and flat design of the portable computing tablets makes it difficult or impossible to grasp with a single hand. Additionally, using a single hand to grip the portable computing tablet will result in poor video quality due to vibrations resulting from a lack of stability. It is also recognized that when using a single hand to grasp the portable computing device, the likelihood of accidentally dropping the portable computing tablet also increases. Dropping the portable computing tablet commonly results damage to at least one of the case and the display. Repair of the damage portable computing tablet is very expensive. Portable computing tablets are also limited to the available lighting for video recording. Portable computing devices do not have adequate light sources to support video recording in poorly lit environments, such as indoors, evenings or night time, and the like.

Accordingly, there remains a need in the art for a portable computing tablet holster enabling a user to hand hold a portable computing tablet with a single hand of a user. Additionally, there exists a need in the art for a portable computing tablet holster incorporating a light emitting device to enhance the ability of the portable computing tablet to film clear and bright still pictures or video.

SUMMARY OF THE INVENTION

The present invention overcomes the deficiencies of the known art and the problems that remain unsolved by providing an apparatus for supporting and controlling a portable computing tablet using a single hand of a user.

In accordance with a first embodiment of the present invention, the invention consists of a portable computing tablet holster assembly comprising:
  a portable computing tablet retention assembly comprising:
    a tablet holster frame rear panel having a first elongate edge, a second elongated edge opposite and parallel to the first elongate edge, a first lateral edge, wherein the first lateral edge extends between like first ends of the first elongate edge and the second elongate edge, a second lateral edge opposite and parallel to the first lateral edge, the second lateral edge extending between like second ends of the first elongate edge and the second elongate edge,
    a tablet holster frame first retention channel extending along at least a portion of the first elongate edge,
    a tablet holster frame second retention channel extending along at least a portion of the second elongate edge,
    a tablet holster frame end retention channel extending along at least a portion of the first lateral edge,
    each channel being designed to receive and retain a respective edge of the portable computing tablet, and
    a pliant tablet retention feature extending inward from a contact surface of the tablet holster frame rear panel, the pliant tablet retention feature being designed to enable passage of the portable computing tablet into the holster and retain the portable computing tablet within the holster during use; and
  a handle having an attachment end and a distal, free end, the handle being attached to the tablet holster frame rear panel at the attachment end thereof.

In a second aspect, the first retention channel and the second retention channel are sized to slideably receive a thickness of a respective edge of the portable computing tablet.

In another aspect, a light emitting device is provided and is located on an outer, exposed surface of the portable computing tablet retention assembly.

In yet another aspect, a switch for controlling the light emitting device is integrated onto the handle or hand grip.

In yet another aspect, the pliant tablet retention feature is a pliant tablet retention tab unitarily formed within a backing panel of the portable computing tablet retention assembly.

In yet another aspect, the pliant tablet retention tab is flexibly formed by a pair of slots extending inward from an exposed edge of the backing panel of the portable computing tablet retention assembly.

In yet another aspect, the pliant tablet retention tab is flexibly formed by a pair of slots extending inward from an exposed edge of the backing panel of the portable computing tablet retention assembly, the pliant tablet retention tab further comprising at least one feature adapted for flexure thereof.

In yet another aspect, the pliant tablet retention tab is flexibly formed by a pair of slots extending inward from an exposed edge of the backing panel of the portable computing tablet retention assembly, the pliant tablet retention tab having a thickness adapted for flexure thereof.

In yet another aspect, the pliant tablet retention tab includes a raised lip extending in a direction away from the backing panel of the portable computing device.

In yet another aspect, the pliant tablet retention feature includes a spring biasing element.

In yet another aspect, the spring biasing element is one of a cantilevered spring, a coil spring, a compression spring, a foam material, and the like.

In yet another aspect, the handle is attached to the portable computing tablet retention assembly by a handle attachment section, the handle attachment section extends axially from an attachment end of the handle.

In yet another aspect, the handle attachment section is affixed to the portable computing tablet retention assembly.

In yet another aspect, the handle attachment section is rigidly affixed to the portable computing tablet retention assembly.

In yet another aspect, the handle attachment section is integral with the portable computing tablet retention assembly.

In yet another aspect, the handle attachment section is moveably assembled to the portable computing tablet holster.

In yet another aspect, the handle attachment section is slideably assembled to the portable computing tablet holster.

In yet another aspect, the handle attachment section is slideably assembled to the portable computing tablet retention assembly using a sliding interface.

In yet another aspect, the handle attachment section is slideably assembled to the portable computing tablet retention assembly using a sliding interface; the sliding interface includes a locking mechanism, wherein the locking mechanism retains the handle attachment section in a desired position on the portable computing tablet retention assembly.

In yet another aspect, the handle attachment section is slideably assembled to the portable computing tablet retention assembly, the handle attachment section comprising a handle attachment tab, the portable computing tablet retention assembly comprising a slot, wherein the handle attachment tab is slideably assembled within the slot.

In yet another aspect, the handle attachment section is pivotally assembled to the portable computing tablet retention assembly.

In yet another aspect, the handle attachment section is pivotally assembled to the portable computing tablet retention assembly, the pivotal motion rotating about an axis that is substantially perpendicular to a plane defined by a surface of a display of the portable computing device.

In yet another aspect, the handle attachment section is pivotally assembled to the portable computing tablet retention assembly, the pivotal motion rotating about an axis that is substantially perpendicular to a plane defined by a surface of a display of the portable computing device and concentrically located on the portable computing tablet retention assembly.

In yet another aspect, the handle attachment section is at least one of pivotally and pivotally assembled to the portable computing tablet retention assembly.

In yet another aspect, the handle attachment section and the portable computing tablet retention assembly are pivotally assembled to one another by a pivot element enabling rotation of the handle relative to the portable computing tablet retention assembly.

In yet another aspect, the pivot element is a pivot pin.

In yet another aspect, the pivot element is a ratchet pivot disk and a mating ratchet mechanism.

In yet another aspect, the handle attachment section is pivotally assembled to the handle.

In yet another aspect, the handle attachment section is pivotally assembled to the handle, the pivotal motion rotating about an axis that is substantially perpendicular to an elongated axis of the handle.

In yet another aspect, the handle includes finger grooves.

In yet another aspect, the handle includes one or more finger grooves, wherein the switch is integral with one of the one or more finger grooves.

In yet another aspect, a controller is integrated into the handle.

In yet another aspect, the controller includes a short range wireless communication circuit, wherein the short range wireless communication circuit is compatible with a short range wireless communication circuit of the portable computing tablet.

In yet another aspect, the controller is in signal communication with a connector, the connector being adapted to connect with a mating connector of the portable computing device.

In yet another aspect, the controller is in signal communication with a non-volatile digital memory device, the non-volatile digital memory device being at least one of integral with the handle and removable from the handle.

In yet another aspect, the controller is in signal communication with a user input device.

In yet another aspect, the user input device being at least one of: a joystick, a touch pad, a digital input wheel, a digital input sphere, a keypad, and the like.

In yet another aspect, the controller is in signal communication with a digital camera, the digital camera being integral with the handle or the portable computing tablet holster.

In yet another aspect, the portable computing tablet retention assembly includes at least one portable computing tablet retention assembly tablet slot, the slot extending inward from the terminating lateral edge of the portable computing tablet holster.

In yet another aspect, the portable computing tablet retention assembly includes at least one retention assembly tablet slot, the slot extending inward from the open, tablet insertion lateral edge of the portable computing tablet retention assembly.

In yet another aspect, the handle is formed comprising an angular segment.

In yet another aspect, the handle is formed comprising an angular segment, the angular segment extending between a handle attachment section and an elongated gripping section.

In yet another aspect, the angular segment enables the user to employ the handle as a stand to support the portable computing tablet retention assembly when placed upon a generally horizontally oriented supporting surface.

In yet another aspect, the angular segment enables the user to rotate the handle to a position located behind (a non tablet side) the portable computing tablet holster.

In yet another aspect, the portable computing tablet holster comprises two handles, the two handles extending downward from a same longitudinal edge of the portable computing tablet retention assembly.

In yet another aspect, the portable computing tablet holster is adapted to control a radio controlled device, wherein at least one user input device is adapted to acquire user input for controlling the radio controlled device is integral with the handle.

In yet another aspect, the portable computing tablet holster is adapted to control the radio controlled device, wherein at least one user input device is integral with each of the pair of handles, each of the at least one user input device is adapted to acquire user input for controlling the radio controlled device.

In accordance with a second embodiment of the present invention, the invention consists of a portable computing tablet holster comprising:
 a first retention member having a first retention plate and a first retention rail extending from the first retention plate, the first retention rail defining a first channel for receipt of a first edge of a portable computing tablet;
 a second retention member movably mounted to the first retention member and having a second retention plate and a second retention rail extending from the second retention plate, the second retention rail defining a second channel for receipt of a second edge of the portable computing tablet;
 a handle assembly including a hand grip attached to the first retention member; and
 at least one slide affixed to one of the first and second retention members and movably mounted relative to the other of the first and second retention members.

In another aspect, the at least one slide comprises a pair of slide pins.

In another aspect, an extension spring is affixed at one end to the first retention member and at an opposite end to the second retention member.

Introducing another embodiment, a portable computing tablet holster for use in supporting a portable computing tablet with a single hand of a user is provided comprising:
 a retention member having a retention plate and a retention rail extending from the retention plate;
 a handle assembly including a handle member; and
 an articulating mechanism pivotally mounted to the handle assembly and rotatably mounted to the retention member.

In another aspect, the retention rail defines a channel for receipt of an upper, a lower and a side edge of a portable computing tablet, the channel extending around an upper edge, a closed side edge and a lower edge of the retention plate.

In another aspect, a light emitting device is provided and is located on an outer, exposed surface of the second retention member.

In another aspect, the handle assembly includes a support member extending from an upper end of the handle member.

In another aspect, the support member includes a light emitting device and the handle member includes a switch for operating the light emitting device.

In another aspect, the support member includes a light emitting device and the handle member includes a touch screen for operating the light emitting device.

In another aspect, the articulating mechanism includes a hinged support arm pivotally mounted on the support member and a ratchet plate affixed to the retention plate and rotatably mounted on the hinged support arm.

In another aspect, the hinged support arm is pivotally mounted to the support member by a hinge.

In another aspect, the ratchet plate includes ratchet teeth engagable with the hinged support arm to incrementally rotate the retention member relative to the handle assembly.

In another aspect, the retention plate includes a hole to accommodate a camera lens of the portable computing tablet and at least one tab engagable with an edge of the portable computing tablet to releasably retain the portable computing tablet within the retention member.

Introducing a further embodiment, a portable computing tablet holster having an integrated system for support and use with a portable computing tablet is provided comprising:
 a retention member for receipt of a portable computing tablet and having a retention plate and a retention rail;
 a handle assembly including a handle member and attached to the retention member;
 a controller positioned within one of the retention member and handle assembly;
 a memory module linked to the controller;
 a user input in the form of a touch screen on the handle member, the user input being linked to the controller; and
 a wired interface linked to the controller and in direct communication with a wired interface of the portable computing tablet.

In another aspect, a camera and light emitting device are mounted on the handle assembly and in operational communication with the controller.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the drawings provided to illustrate and not to limit the invention, in which:

FIG. 6A presents a partial viewing side elevation view of a first exemplary alternative embodiment of the portable computing tablet holster, the alternative embodiment incorporating a handle pivotally assembled to a non-viewing side of a base tablet rear support panel of the portable computing tablet holster, the handle being shown in a fully extended configuration;

FIG. 6B presents a partial viewing side elevation view of the portable computing tablet holster originally introduced in FIG. 6A, the illustration presenting the handle partially rotated relative to the base tablet rear support panel of the portable computing tablet holster;

FIG. 6C presents a partial viewing side elevation view of the portable computing tablet holster originally introduced in FIG. 6A, the illustration presenting the handle rotated one-hundred-eighty degrees (180°) relative to the base tablet rear support panel of the portable computing tablet holster;

Like reference numerals refer to like parts throughout the several views of the drawings.

DETAILED DESCRIPTION OF DRAWINGS

The following detailed is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
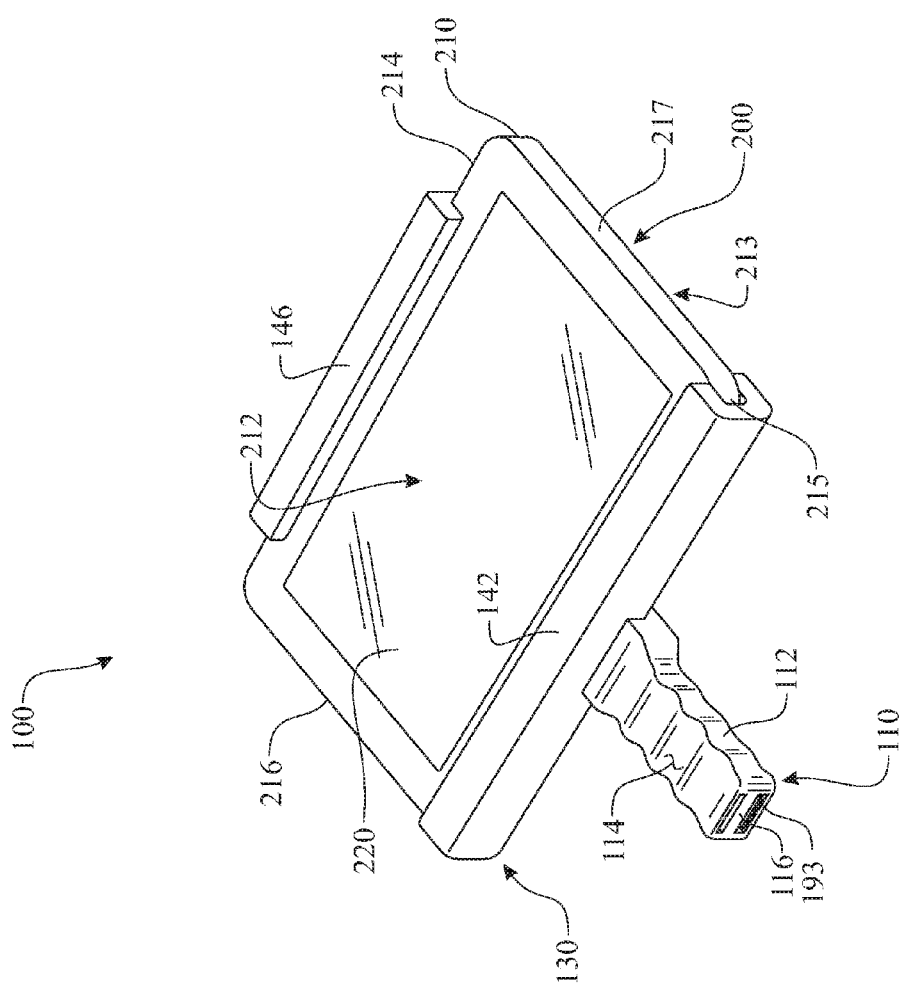
FIG. 1 presents an isometric view of a first exemplary portable computing tablet holster employed to retain a portable computing tablet.
Figure 2:
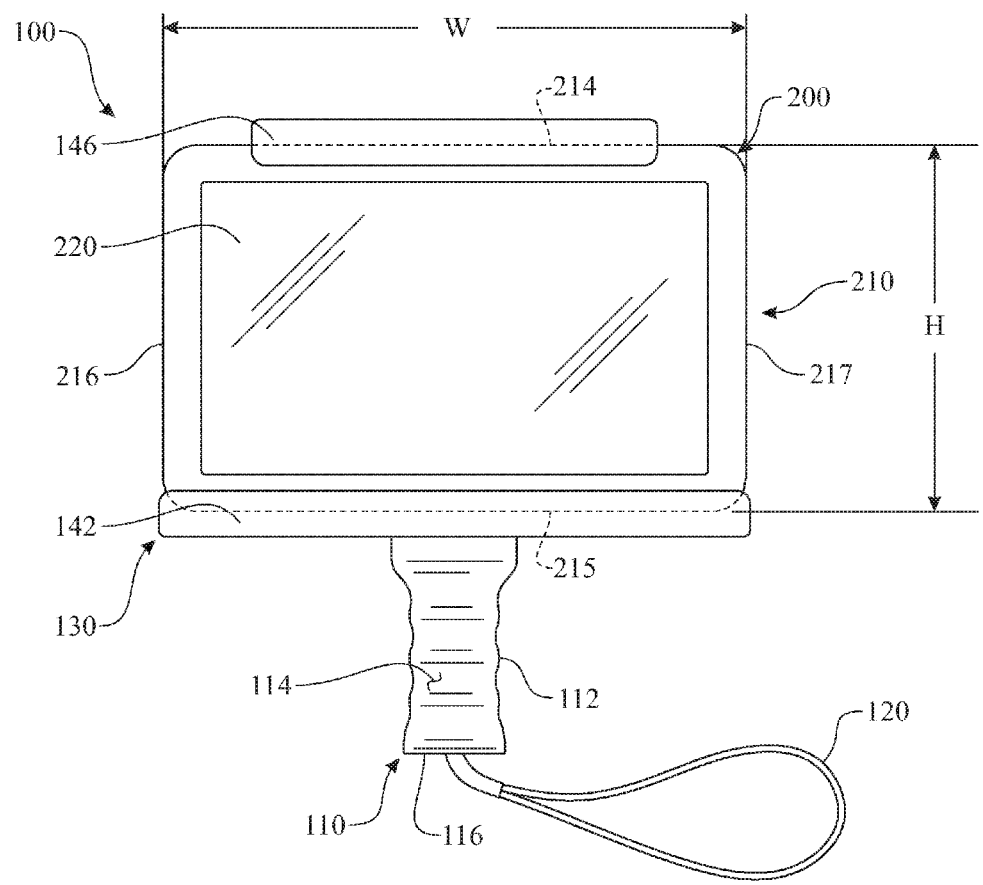
FIG. 2 presents a viewing side elevation view of the exemplary portable computing tablet holster originally introduced in FIG. 1 the portable computing tablet being inserted into and supported by the portable computing tablet holster.
Figure 3:
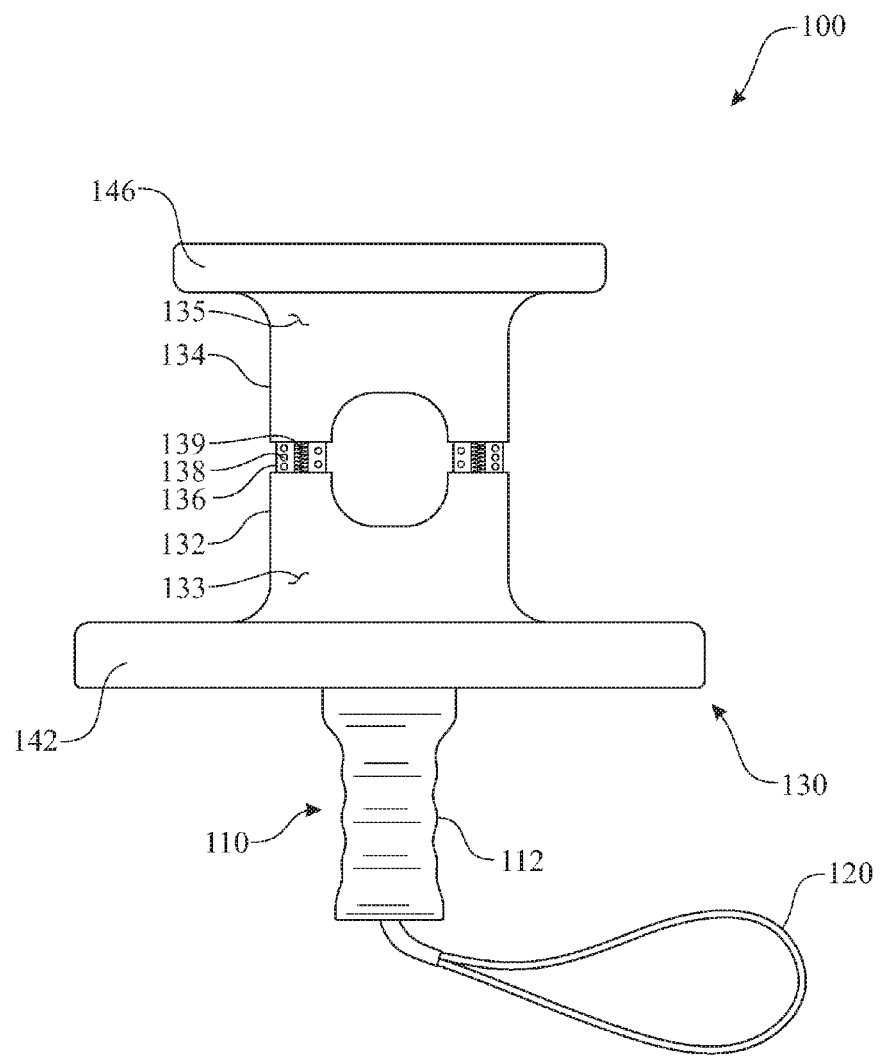
FIG. 3 presents a viewing side elevation view of the exemplary portable computing tablet holster originally introduced in FIG. 1, the illustration introducing a base tablet rear support panel and an expanding tablet rear support panel, the base tablet rear support panel and the expanding tablet rear support panel being shown in a fully extended configuration.
Figure 4:
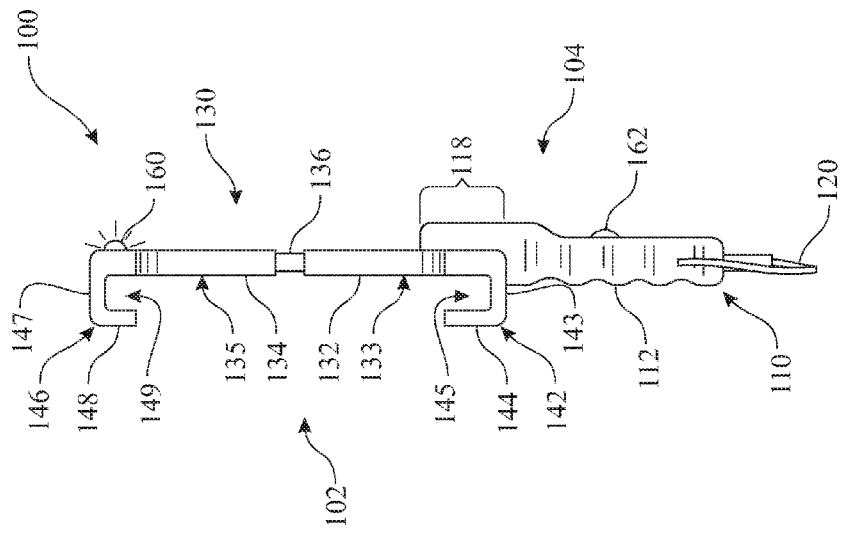
FIG. 4 presents an outward elevation view of the exemplary portable computing tablet holster originally introduced in FIG. 1, the base tablet rear support panel and an expanding tablet rear support panel being shown in a fully contracted configuration.
Figure 5:
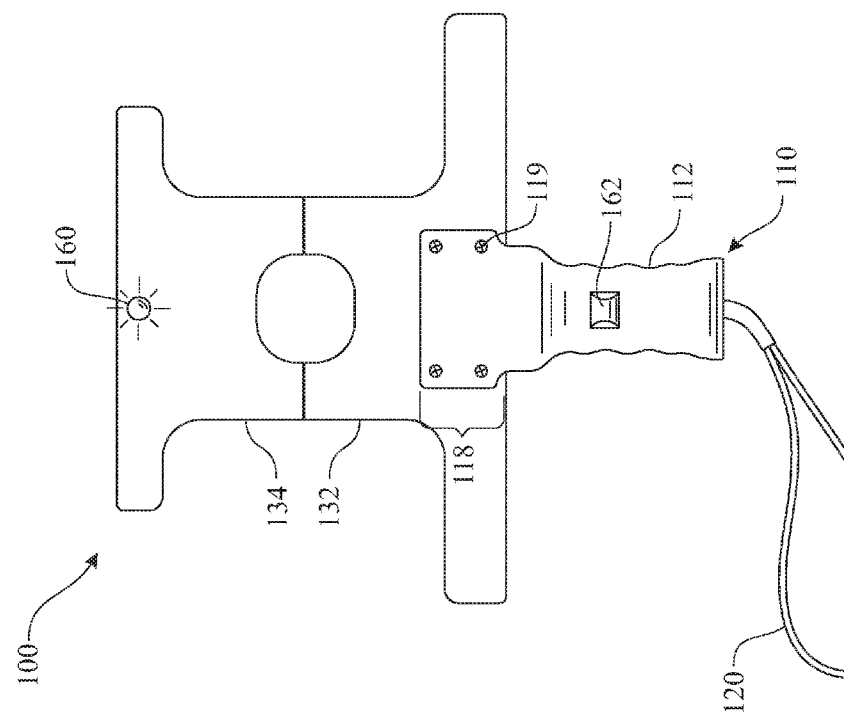
FIG. 5 presents a side elevation view of the exemplary portable computing tablet holster originally introduced in FIG. 1, the base tablet rear support panel and an expanding tablet rear support panel being shown in a fully extended configuration.

A portable computing tablet holster 100 is initially introduced in FIGS. 1 and 2, with details being presented in FIGS. 3 through 5. Orientation of the portable computing tablet holster 100, as identified in FIG. 5, is referred to by a respective function thereof, including a portable computing tablet holster viewing side 102 and a portable computing tablet holster opposite, non-viewing or recording side 104. The portable computing tablet holster 100 is adapted for use in supporting and manipulating a portable computing tablet 200 using a single hand of a user. The portable computing tablet holster 100 generally includes a handle assembly 110 assembled to a portable computing tablet retention assembly 130. The portable computing tablet retention assembly 130 includes a tablet holster frame rear panel or tablet rear support panel 132, 134. The tablet rear support panel 132, 134 can be provided as a single unit or separated into two sections (as shown), more specifically, comprising a base tablet rear support panel 132 and a expanding tablet rear support panel 134. The base tablet rear support panel 132 and the expanding tablet rear support panel 134 would be slideably assembled to one another using a sliding assembly mechanism. The sliding assembly mechanism can include any suitable mechanism enabling expansion (FIGS. 3 and 5) and contraction (FIG. 4) between the base tablet rear support panel 132 and the expanding tablet rear support panel 134. The exemplary illustration employs a rear panel expansion sliding element 136, a rear panel extension biasing element 139, and a rear panel extension detent feature 138 to provide the expansion and the contraction between the base tablet rear support panel 132 and the expanding tablet rear support panel 134.

The portable computing tablet 200 is retained within the portable computing tablet retention assembly 130 by a base elongated retention element 142, located along an elongated edge of a base tablet rear support panel 132 of the portable computing tablet retention assembly 130 proximate the handle assembly 110, and a distal elongated retention element 146, located along a free elongated edge of the expanding tablet rear support panel 134 of the portable computing tablet retention assembly 130. Details of the sections of each of the elongated retention elements 142, 146 are best identified in FIG. 5. Each of the elongated retention elements 142, 146 is shaped having an elongated retention element channel formation 145, 149, each elongated retention element channel formation 145, 149 comprising the respective section of the tablet rear support panel 132, 134, an elongated retention element channel base segment 143, 147 and an elongated retention element channel rail segment 144, 148. Each elongated retention element channel base segment 143, 147 extends generally perpendicularly from the respective section of the tablet rear support panel 132, 134 towards the viewing side of the portable computing tablet holster 100. Each elongated retention element channel rail segment 144, 148 extends generally perpendicularly from the respective elongated retention element channel base segment 143, 147 towards the center of the portable computing tablet holster 100. The resulting elongated retention element channel formations 145, 149 of the elongated retention elements 142, 146 are arranged facing one another. The portable computing tablet 200 is slideably inserted into the portable computing tablet retention assembly 130, sliding each elongated edge 214, 215 within the respective elongated retention element channel formation 145, 149. The rear, non-viewing surface 213 of the portable computing tablet 200 would slide against a rear support panel tablet contacting surface 133, 135 of the respective tablet rear support panel 132, 134. It is understood that a spacing element, such as a sheet of rubber, plastic, foam, and the like can be applied to the rear support panel tablet contacting surface 133, 135 or to the rear, non-viewing surface 213. The spacing element would compensate for dimensional differences between a thickness of the portable computing tablet 200 and a depth defined by the elongated retention element channel formations 145, 149.

The handle assembly 110 includes a handle attachment section 118 extending axially from an attachment end of a handle 112. The handle attachment section 118 is affixed to a non-viewing side of the base tablet rear support panel 132. A flexible wrist loop or lanyard 120 is attached to a distal, free handle end 116 of the handle 112. The lanyard 120 can be fabricated of materials and include any of many features associated with commonly known lanyards. The handle 112 can be covered by a pliant material for comfort to a user and/or to enhance a grip of a user. The pliant material can be any suitable pliant material, including foam, rubber, soft plastic, nylon, neoprene, and the like. The portable computing tablet 200 is commonly used to operate applications, access the Internet, listen to music, recording music, communicate with others (audio chat, video chat, short message service (SMS), Multimedia Messaging Service (MMS), email, and the like), play games, view digital images, view videos, capture digital still images, capture video, and the like. The portable computing tablet 200 generally includes electronic circuitry, a portable power supply, a touch screen 220, a microphone, a speaker, at least one user input button at least one connector, and the like, wherein all of the components are contained within and/or supported by a portable computing tablet housing 210. Orientation of the portable computing tablet housing 210 can be referenced by functionality, more specifically, a front, viewing surface 212 and an opposite rear, non-viewing surface 213.

The portable computing tablet housing 210 has a peripheral edge defined by a pair of elongated edges 214, 215 and a pair of lateral edge 216, 217. The portable computing tablet holster 100 can be adapted to retain different sized portable computing tablets 200, more specifically, the portable computing tablet holster 100 is designed to retain portable computing tablets 200 of any reasonable width "W" and height "H", as identified in FIG. 2. The exemplary portable computing tablet holster 100 includes the expanding tablet rear support panel 134, which is slideably assembled to the base tablet rear support panel 132, as shown in FIGS. 3 through 5. The base elongated retention element 142 is carried by the base tablet rear support panel 132 and remains in a fixed positioned respective to the handle 112. The distal elongated retention element 146 is carried by the expanding tablet rear support panel 134. The slideable positioning of the expanding tablet rear support panel 134 respective to the base tablet rear support panel 132 enables adjustment the distance between the base elongated retention element 142 and the distal elongated retention element 146 to accommodate the height "H" of the portable computing tablet 200. It is noted that a span of the elongated retention element channel formations 145, 149 is sized to accommodate a thickness (not identified in the drawings, but understood by definition) of the portable computing tablet 200. It is noted that padding can be adhesively secured to a rear support panel tablet contacting surface 133, 135 of each of the tablet rear support panels 132, 134 to improve a fit of the portable computing tablet 200 within each of the elongated retention element channel formations 145, 149.

The expanding tablet rear support panel 134 is movably assembled to the base tablet rear support panel 132 to capture, secure, and retain the portable computing tablet 200 between the base elongated retention element 142 and the distal elongated retention element 146. At least one panel expansion sliding element 136 is affixed to each of the base tablet rear support panel 132 and the expanding tablet rear support panel 134. In one embodiment, the at least one panel expansion sliding element 136 can be assembled into a cavity formed within each of tablet rear support panels 132, 134. One end can be fixed in one of the tablet rear support panels 132, 134 and the second end can be slideably received in the other of the tablet rear support panels 132, 134. At least one rear panel extension biasing element 139 can be provided to support the expansion and contraction provided by the tablet rear support panels 132, 134. In a preferred solution, the at least one rear panel extension biasing element 139 would provide a contraction force between the base tablet rear support panel 132 and the expanding tablet rear support panel 134, ensuring pressure remains against the elongated edges 214, 215 of the portable computing tablet 200. The rear panel expansion sliding element 136 can include one or more rear panel extension detent features 138, such as protrusions and depressions, wherein the one or more rear panel extension detent features 138 are adapted to retain the base tablet rear support panel 132 and the expanding tablet rear support panel 134 at any of a number of predetermined spans. The one or more rear panel extension detent features 138 can provide discrete increments defining discrete spans between the base elongated retention element 142 and the distal elongated retention element 146.

The handle assembly 110 includes a handle attachment section 118, as shown in FIG. 4. The handle attachment section 118 extends from an attachment end of the handle 112 along an axis that is parallel to an elongated axis of the handle 112. The handle attachment section 118 is affixed to the base tablet rear support panel 132 by any suitable assembly method, including an adhesive, a bonding agent, mechanical fasteners, ultrasonic welding, heat staking, and the like. In the exemplary illustration, the attachment section 118 is assembled to the base tablet rear support panel 132 using a plurality of handle assembly fasteners 119, such as screws, rivets, compression pins, and the like. In an alternative design, the handle assembly 110 can be integrally fabricated with the base tablet rear support panel 132. The handle 112 is critical to the usefulness of the portable computing tablet holster 100, as the handle 112 allows the user to hold the portable computing tablet 200 using a single hand or increase the stability using a second hand.

The portable computing tablet holster 100 can additionally include a light emitting device 160 (FIGS. 4 and 5) to provide sufficient lighting for taking pictures with a camera 296 (FIG. 15) of the portable computing tablet 200. The light emitting device 160 illuminates the subject matter for the picture. The light emitting device 160 can be any suitable light emitting device, including an incandescent bulb, a light emitting diode, or other light emitting source. The light emitting device 160 is provided on a front surface 160 of the second retention member 114. An actuation switch 162 is located on a non-viewing side of the handle 112 and is electrically connected to the light emitting device 160 by way of any known electrical connective interface to actuate and deactivate the light emitting device 160. Locating the actuation switch 162 on the non-viewing side of the handle 112 enables the user to operate the actuation switch 162 using their finger. Alternatively, the actuation switch 162 can be located on the viewing side of the handle 122, enabling the user to operate the actuation switch 162 using their thumb.

A connector 193 can be integrated into the distal, free handle end 116 of the handle 112. The connector 193 would be in signal and/or power communication with a controller circuit and/or a portable power supply integrated into the portable computing tablet holster 100. The exemplary connector 193 is a Universal Serial Bus (USB connector).

Although the illustrations present a solid tablet rear support panel 132, 134, it is understood that the tablet rear support panel 132, 134 can be perforated to reduce material costs and weight. The perforations can be of any desired shape, including circular, oval, hexagonal, octagonal, square, rectangular, triangular, star shaped, of a parallelogram, heart shaped, a freeform shape, a graphical illustration, and any other shape or image that the designer dreams up. The perforation can be similar in size and/or shape or varied in size and/or shape.

The various components can be fabricated of a molded plastic, casting, stamping, additive manufacturing (3-D printing) (stereolithography, metal sintering, and the like), a machined material (plastic, metal, wood, or any other suitable material), off the shelf components (springs 139, sliding mechanisms 136, screws 119, connectors 193, electronic components, light emitting devices 160, switches 162, straps for the lanyard 120, heat shrink tubing (for connecting two ends of the lanyard 120), ringlets (for attaching the lanyard 120 to the distal end 116 of the handle 110, and the like), and any other manufacturing and/or assembly processes and associated materials. The various components would be assembled according to common assembly practices.

The handle of the portable computing tablet holster 100 is rigidly affixed to the base tablet rear support panel 132. The handle assembly 110 can be replaced with a pivotal handle assembly 310 pivotally assembled to a retention assembly 330 of a portable computing tablet holster 300, as illustrated in FIGS. 6A through 6C. The portable computing tablet holster 300 and the portable computing tablet holster 100 have a number of like features. Like features of the portable computing tablet holster 300 and the portable computing tablet holster 100 are numbered the same except preceded by the numeral '3'.

In the portable computing tablet holster 300, the handle assembly 110 is pivotally assembled to a non-viewing side of the base tablet rear support panel 132 using a pivoting assembly. In the exemplary illustration, a pivot axle 370 extends through a pivot axle bore 372 on a handle attachment section 318 of a handle assembly 310 and is affixed to a base tablet rear support panel 332. The pivoting assembly enables at least one of a clockwise and a counterclockwise rotation of the handle assembly 110 relative to the base tablet rear support panel 332 to aid in positioning the portable computing tablet 200 (not shown) or to place the portable computing tablet holster 300 into a storage configuration, as shown in FIG. 6C. The pivoting assembly can include a clutch or similar feature (not shown) to adjust a resistance to the rotational motion. The clutch or similar feature would dictate the torsional force required to rotate the handle assembly 310 respective to the retention assembly 330. The pivoting assembly can include a unidirectional feature, which would limit the rotation of the handle assembly 310 respective to the retention assembly 330 to one of the clockwise or the counterclockwise direction of rotation.

Figures 7A, 7B:
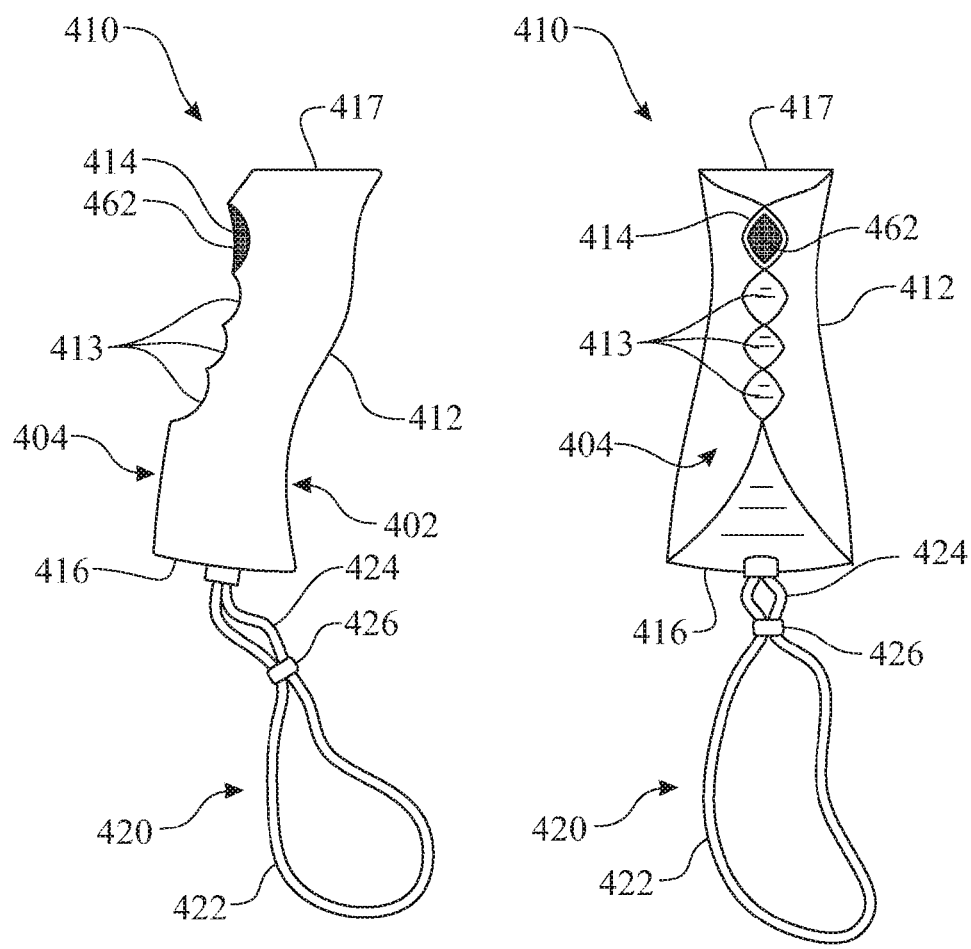
FIG. 7A presents a side elevation view of an exemplary ergonomic handle for use with any suitable variant of the disclosed portable computing tablet holsters.
FIG. 7B presents a viewing side elevation view of the ergonomic handle originally introduced in FIG. 7A.

As shown in the various illustrations throughout this application, the handle can be of any suitable size and shape. A handle assembly 410 can include a handle 412 having ergonomic features, such as a curved gripping surface on a viewing handle side 402 and a series of handle finger receiving formations 413 formed on an opposite non-viewing handle side 404, as shown in FIGS. 7A and 7B. The handle assembly 410 can include a lanyard 420. The lanyard 420 is attached to a distal, free handle end 416 of the handle 412. The lanyard 420 can provide multiple functions, including retention of the portable computing tablet holster when the portable computing tablet holster accidentally slips from the user's grip, stabilizing the handle 412 relative to a wrist of a user, and the like. The functionality of the lanyard 420 can be enhanced by including a lanyard sizing loop slide bead 426. The lanyard sizing loop slide bead 426 segment the lanyard 420 into a proximal lanyard loop 424 and a distal lanyard loop 422. The user would place the distal lanyard loop 422 over their wrist. The user would then slide the lanyard sizing loop slide bead 426, reducing the size of the distal lanyard loop 422, tightening or cinching the distal lanyard loop 422, thus securing the lanyard 420 to the user. The ergonomic handle 412 allows the user to hold the portable computing tablet holster 100 with greater stability than the handle 112. The increased stability is provided by the shape of the handle 412. The handle 412 of the handle assembly 410 is designed to include a side profile having a pistol grip shape, as shown in FIG. 7A and a front profile having an hour glass shape, as shown in FIG. 7B.

A plurality of handle finger receiving formations 413 are formed or molded into a non-viewing handle surface 404 of the handle 412 to further aid in gripping the handle. As disclosed above, the light emitting device is incorporated in the portable computing tablet holster. The light emitting device provides light during a condition that lacks sufficient light for capturing video by the portable computing tablet 200. The handle 412 can include an actuation switch 462 to operate the light emitting device 160. The actuation switch 462 could be included within a proximal handle finger receiving formation 414. A handle attachment section, such as any handle attachment section presented herein 118, can be integrated into the handle assembly 410, wherein the handle attachment section preferably extends upward from a proximal handle end 417 of the handle 412. The handle attachment section is provided for attachment of the handle 412 to the base tablet rear support panel 132 by any suitable attachment configuration, such as handle assembly fasteners 119, a pivot axle 370, or any other handle assembly configuration taught herein or other configurations known by those skilled in the art.

An alternative embodiment of a portable computing tablet holster 500 for use in supporting and manipulating the portable computing tablet 200 using a single hand of a user is illustrated in FIGS. 8 through 14. The portable computing tablet holster 500 is an enhanced variant of the portable computing tablet holster 100. Like features of the portable computing tablet holster 500 and the portable computing tablet holster 100 are numbered the same, except preceded by the numeral '5'.

A first distinction of the portable computing tablet holster 500 is an inclusion of a lateral retention channel. The lateral retention channel includes the same elements 143, 144; 147, 148 as the elongated retention base segments 142, 146 to define the elongated retention element channel formations 145, 149, respectively. The exemplary lateral retention channel is segmented into a lateral retention base segment 552, a lateral retention central segment 554 and a lateral retention distal segment 556. The lateral retention base segment 552 is preferably continuous with the base elongated retention element 542. Similarly, the lateral retention distal segment 556 is preferably continuous with the distal elongated retention element 546. The lateral retention central segment 554 is provided to support a connector 593. The connector 593 can be employed to simply provide mechanical coupling between the portable computing tablet 200 and the portable computing tablet retention assembly 530 or the connector 593 can be in electrical and/or signal communication with electrical and/or power components located in the handle 512. Connectivity therebetween would be provided in accordance with any electrical and/or signal connectivity configuration known by those skilled in the art. The connectivity configuration would support the rotational motion and/or the pivotal motion, where applicable.

A second distinction of the portable computing tablet holster 500 is the inclusion of an articulating assembly 580. The articulating assembly 580 enables at least one of a rotational motion between a handle assembly 510 and a portable computing tablet retention assembly 530 and a pivotal motion between the handle assembly 510 and the portable computing tablet retention assembly 530. The rotational motion between a handle assembly 510 and a portable computing tablet retention assembly 530 rotates about an axis that is perpendicular to a viewing surface of the portable computing tablet 200. The pivotal motion between a handle assembly 510 and a portable computing tablet retention assembly 530 pivots about an axis that is perpendicular to a longitudinal axis of the handle 512. The articulating motion enables the user to optimize the orientation of the portable computing tablet 200 for viewing the touch screen 220, taking photographs, capturing video, or any other use. The articulating motion additionally allows for positioning of the camera 296 of the portable computing tablet 200.

Figure 9:
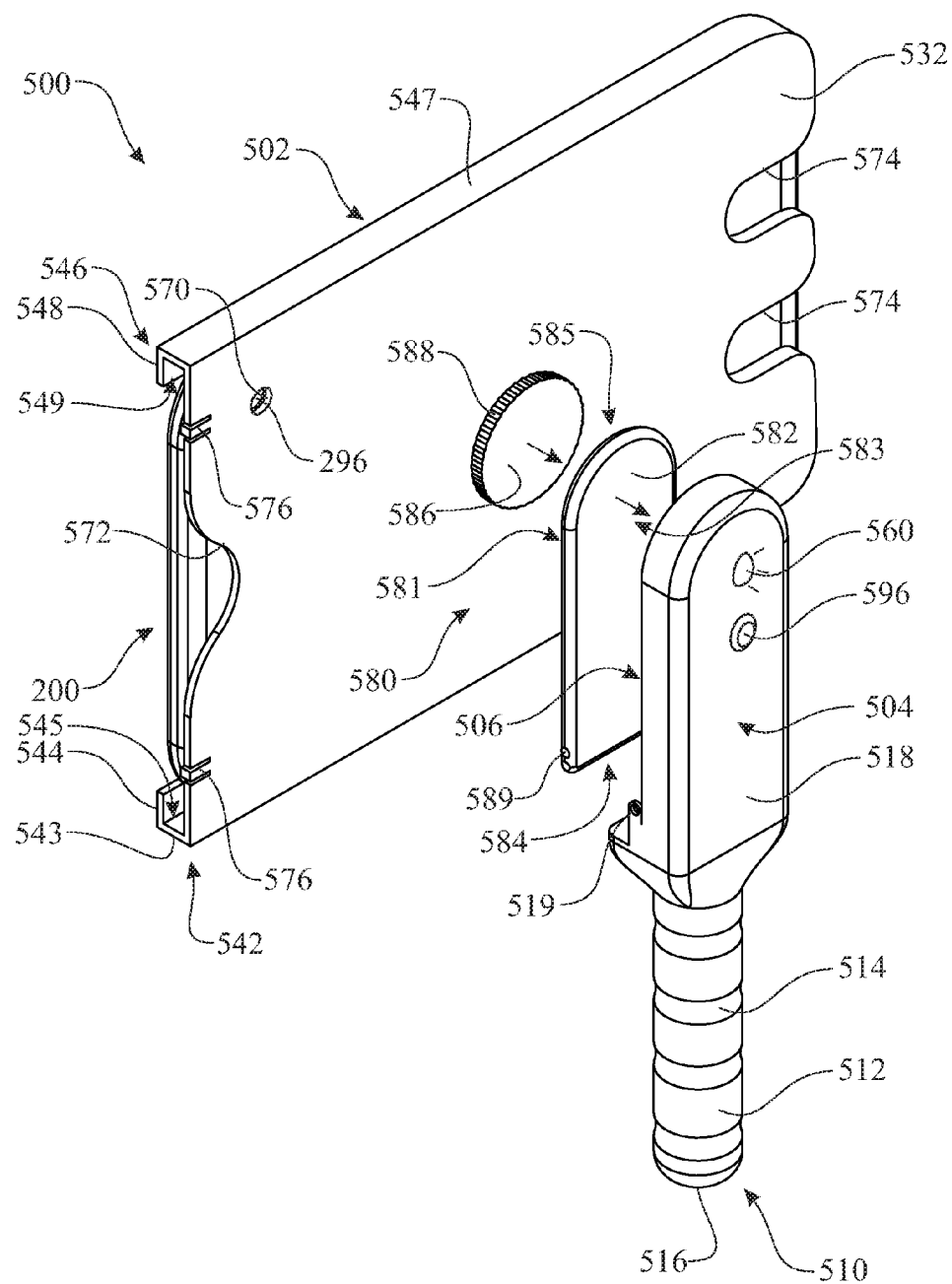
FIG. 9 presents an exploded isometric non-viewing side view of the portable computing tablet holster originally introduced in FIG. 8, the illustration introducing components of a ratcheting system.
Figure 10:
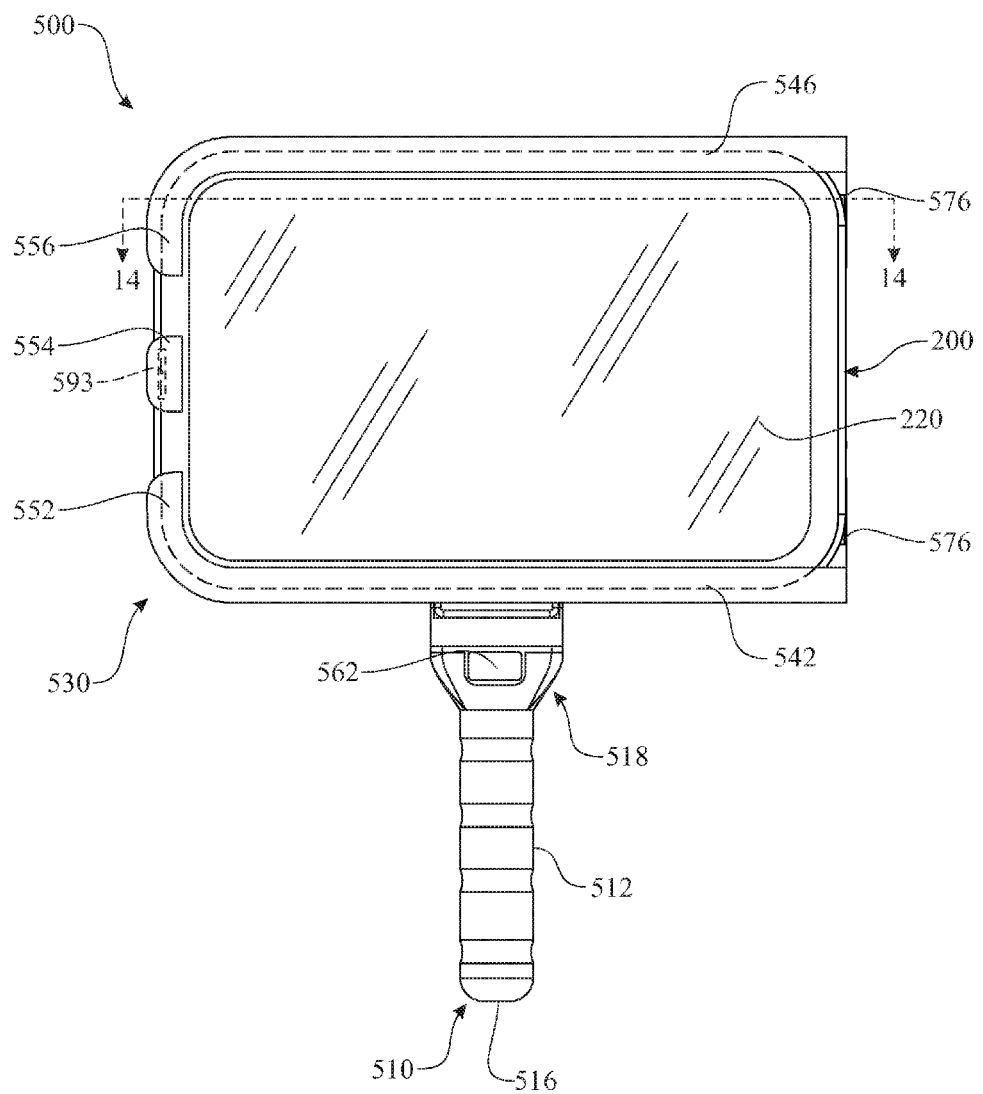
FIG. 10 presents a viewing side elevation view of the portable computing tablet holster originally introduced in FIG. 8.

The articulating assembly 580 includes a series of components enabling the rotational motion and the pivotal motion, as best shown in the exploded assembly view illustrated in FIG. 9. The rotational motion, as demonstrated in FIGS. 9 and 10, can be provided by an inclusion of any rotational element. In the exemplary illustration, the rotational element is a ratchet rotation disk 586. A series of rotation disk ratchet teeth 588 are formed about a peripheral edge of the ratchet rotation disk 586. The ratcheting function provided by the rotation disk ratchet teeth 588 controls the rotational motion of the handle assembly 510 and the portable computing tablet retention assembly 530 relative to one another. The rotation disk ratchet teeth 588 engage with a mating feature provided on or formed within a cavity of a hinged support arm 582 or alternatively provided on the portable computing tablet retention assembly 530, or in a configuration excluding a pivotal capability, on the 518. The hinged support arm 582 is assembled abutting a handle attachment interior surface 506 of the handle attachment section 518 of the handle assembly 510.

Figure 11:
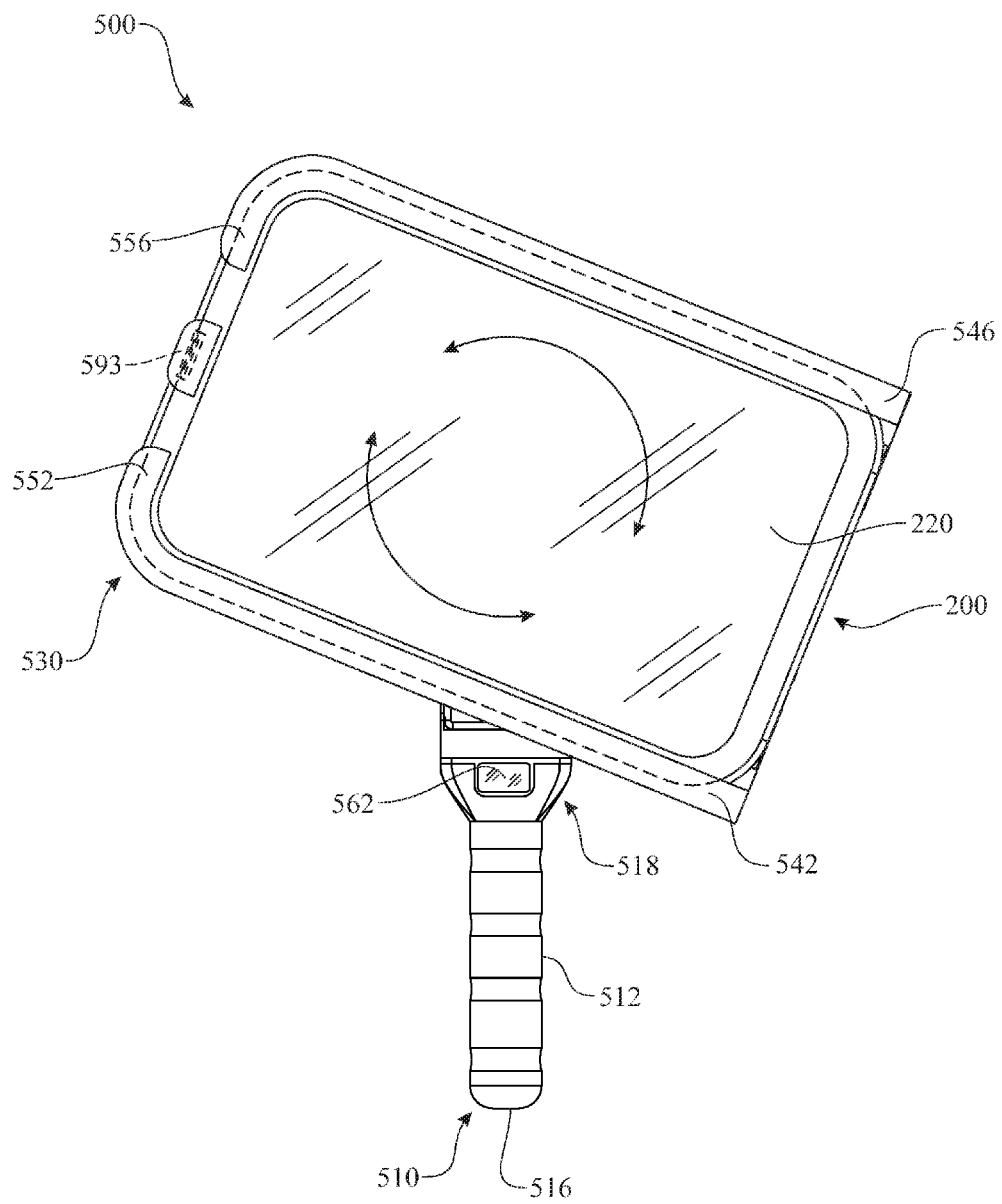
FIG. 11 presents a viewing side elevation view of the portable computing tablet holster originally introduced in FIG. 8, the illustration introducing a rotation of a portable computing tablet retention assembly relative to an ergonomic handle assembly.
Figure 12:
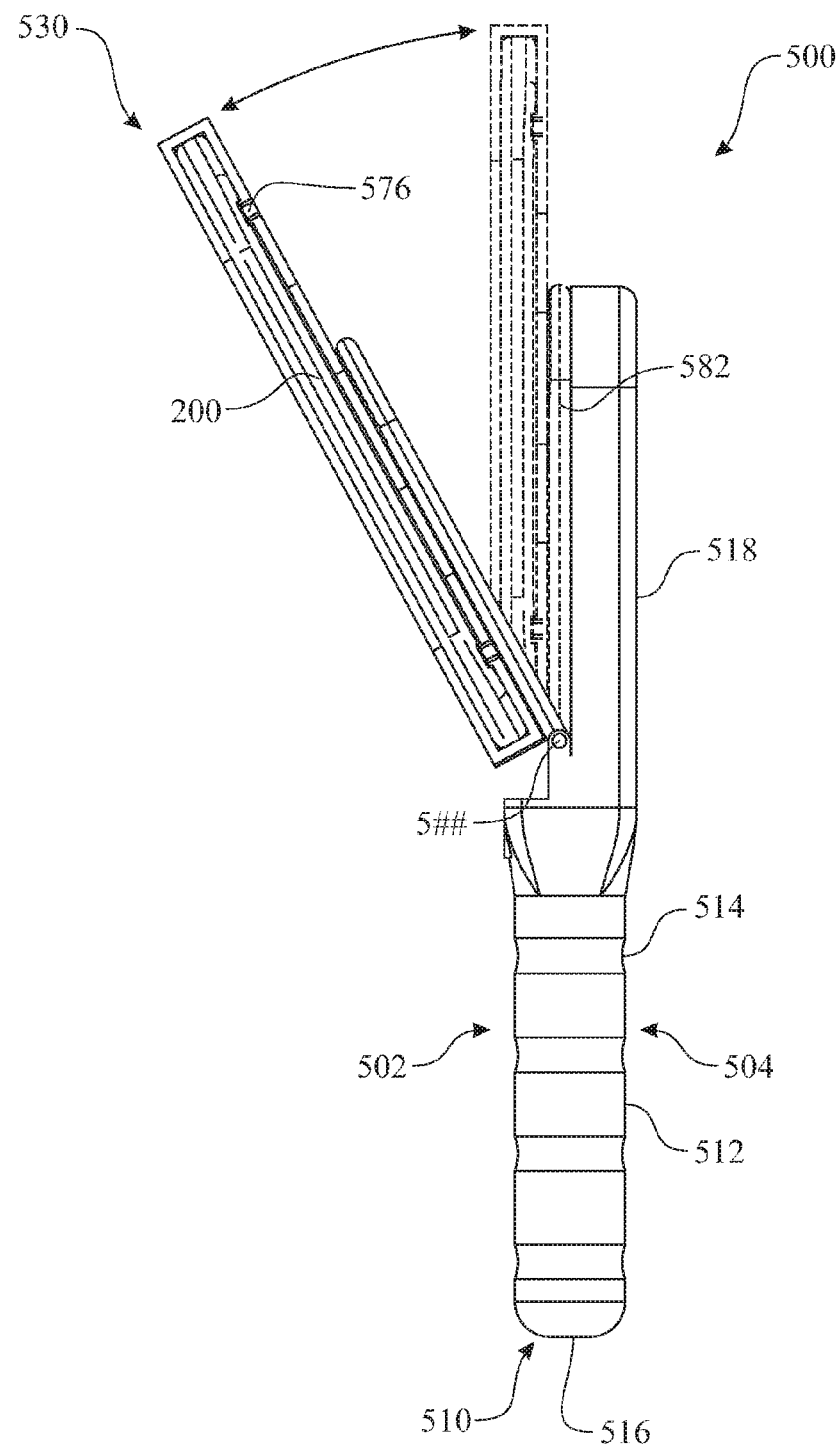
FIG. 12 presents a side elevation view of the portable computing tablet holster originally introduced in FIG. 8, the illustration introducing a pivotal motion of the computing tablet retention assembly relative to the handle assembly.

The pivotal motion is provided by a pivotal assembly between the hinged support arm 582 and the handle assembly 510 (as shown) or between the portable computing tablet retention assembly 530 and the handle assembly 510 using a similar pivotal assembly configuration as illustrated in FIG. 11. Orientation of the hinged support arm 582 can be referenced by a hinged support arm holster pivot surface 581, a hinged support arm holster hinged assembly surface 583, a hinged support arm assembly edge 584, and a hinged support arm distal free edge 585. The hinged support arm 582 is hingeably or pivotally assembled to the handle attachment section 518 of the handle assembly 510 using any suitable pivot assembly configuration. In the exemplary illustration, a pin (not shown, but understood by description) is inserted through a pair of hinge tab bores 519 formed through tabs of the handle attachment section 518 and a like hinge bore 589 formed through the hinged support arm 582. Alternatively, the tabs can be formed on the hinged support arm 582 and a single bore can be formed through the handle attachment section 518. The pivot assembly configuration may take various forms, including a pinned hinge, a piano hinge, a living hinge integrally molded into the support member 330 and the support plate 344, individual discrete hinges, and the like.

Figure 8:
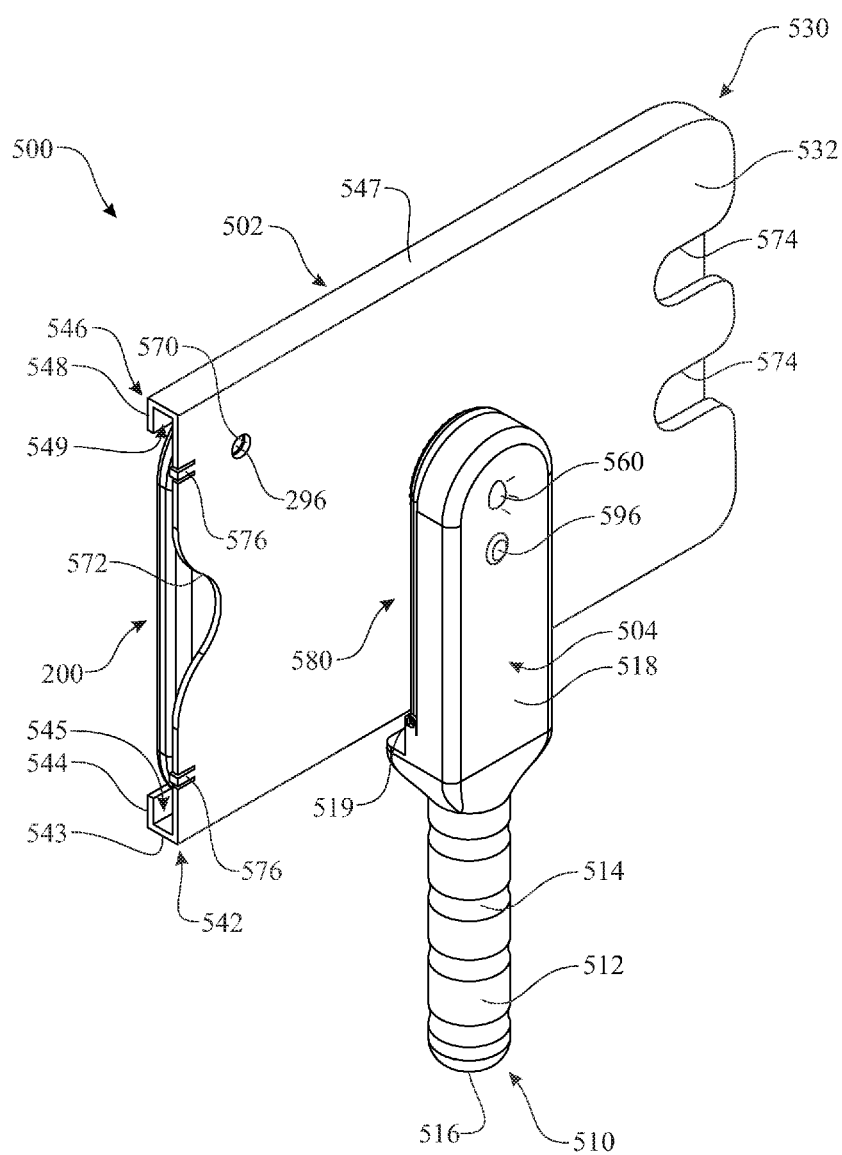
FIG. 8 presents an isometric non-viewing side view of another exemplary alternate embodiment of a portable computing tablet holster, the illustration showing a portable computing tablet inserted into a portable computing tablet retention assembly of the portable computing tablet holster.

The portable computing tablet retention assembly 130, more specifically the tablet rear support panel 132, 134, of the portable computing tablet holster 100 is shaped providing clearance for the camera 296 of the portable computing tablet 200. In the exemplary portable computing tablet holster 500, a camera viewing aperture 570 is formed through a tablet holster frame rear panel or base tablet rear support panel 532 of the portable computing tablet retention assembly 530 to accommodate the camera 296 of the portable computing tablet 200, as shown in FIGS. 8 and 9.

Figure 13:
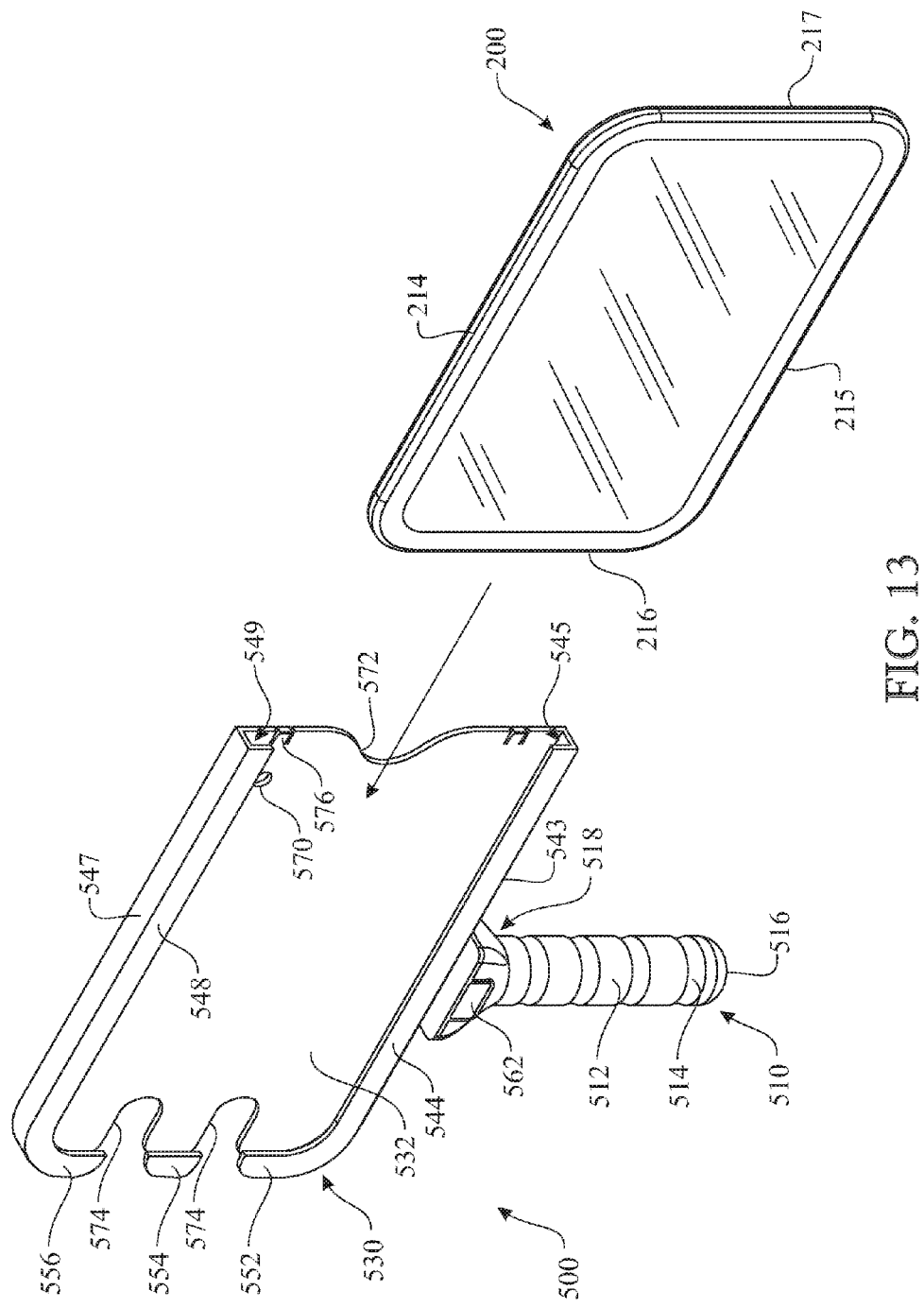
FIG. 13 presents an isometric assembly view of the portable computing tablet holster originally introduced in FIG. 8 and portable computing tablet, the illustration introducing a process of inserting the portable computing tablet into the portable computing tablet retention assembly of the portable computing tablet holster.
Figure 14:
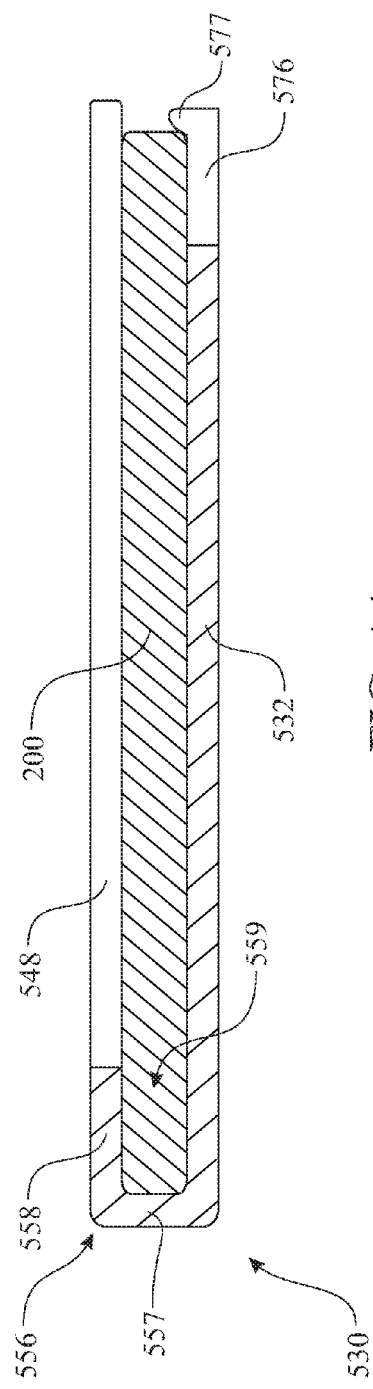
FIG. 14 presents a sectional view of the portable computing tablet holster and portable computing tablet, the section being taken along section line 14-14 in FIG. 10, the illustration introducing a tab, wherein the tab is employed to retain the portable computing tablet within the portable computing tablet retention assembly.
Figure 15:
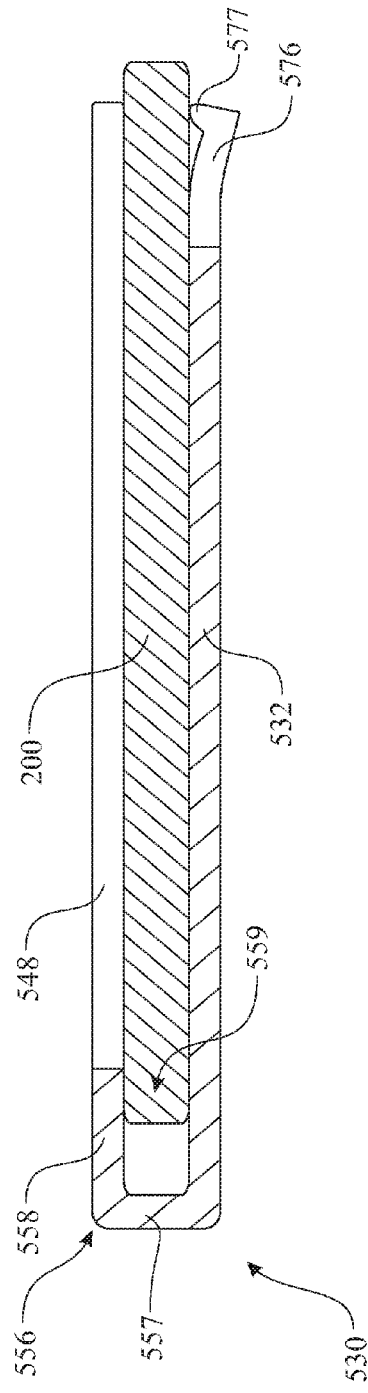
FIG. 15 presents a sectional view of the portable computing tablet holster and portable computing tablet, the section being similar to the section taken along section line 14-14 in FIG. 10, wherein the tab is deformed to allow for removal of the portable computing tablet from the portable computing tablet retention assembly.

The portable computing tablet retention assembly 130, more specifically the tablet rear support panel 132, 134, of the portable computing tablet holster 100 is shaped providing clearance for the user's fingers for both insertion of the portable computing tablet 200 into the portable computing tablet retention assembly 130 and removal of the portable computing tablet 200 from the portable computing tablet retention assembly 130. A portable computing tablet holster open end slot 572 is formed along a lateral edge at an insertion side of the base tablet rear support panel 532. The portable computing tablet holster open end slot 572 enables the user to apply an insertion force to the portable computing tablet 200 throughout the insertion process, particularly during the last short distance wherein the respective lateral edge of the portable computing tablet 200 is positioned beyond the open lateral edge of the base tablet rear support panel 532. The portable computing tablet holster open end slot 572 enables the user to insert the portable computing tablet 200 into the portable computing tablet retention assembly 530, as shown in FIG. 13, wherein the respective lateral edge passes across a flexible cantilevered retention element nib 577 of a flexible cantilevered retention element 576, as shown in FIG. 15, enabling the flexible cantilevered retention element 576 to return to an un-deformed position, thus positioning the flexible cantilevered retention element nib 577 into a retention configuration, as shown in FIG. 14. The flexible cantilevered retention element 576 is representative of any pliant tablet retention feature having a mechanical feature that is biased to move into and from a retention position. It is noted that the base tablet rear support panel 532 can flex slightly to allow the portable computing tablet 200 to be released from each flexible cantilevered retention element nib 577 of each respective flexible cantilevered retention element 576.

It is understood that the configuration of the retention tabs 576 is only exemplary and that any configuration that can be depressed to enable the portable computing tablet 200 to pass across the pliant retention feature can be employed. Other pliant retention features can include a biasing spring, a spring biased bearing or ball catch, a cantilevered spring, a spring loaded catch, and the like. In addition to the retention feature, or as an alternate, less desirable configuration, the retention element channel formations (similar to the 145, 149) can be designed to provide a friction fit with the portable computing tablet housing 210 to aid in retaining the portable computing tablet 200 within the portable computing tablet retention assembly 530.

Once the portable computing tablet 200 is properly seated within the portable computing tablet retention assembly 530, it might be difficult to remove the portable computing tablet 200 from the portable computing tablet retention assembly 530. At least one portable computing tablet holster tablet securing end slots 574 can be formed through the base tablet rear support panel 532, extending inward from a lateral retaining edge including the connector 593, as shown in FIGS. 8 and 9. The lateral retention segment is sectioned to accommodate each of the at least one portable computing tablet holster tablet securing end slot 574. In the exemplary illustration, the portable computing tablet holster 500 includes a pair of portable computing tablet holster tablet securing end slots 574, the pair of portable computing tablet holster tablet securing end slots 574 sections the lateral retaining edge into the lateral retention base segment 552, lateral retention central segment 554, and lateral retention distal segment 556. The lateral retention base segment 552 and the lateral retention central segment 554 are representative of one form factor of a tablet holster frame end retention feature. The exemplary lateral retention base segment 552 and the exemplary lateral retention central segment 554 are continuations of the channel formation of the tablet holster frame retention channels 544, 548. The lateral retention central segment 554 is included to support the connector 593, located specifically to mate with a connector 293 of the portable computing tablet 200. The inclusion of the portable computing tablet holster tablet securing end slot 574 provide the user with an access for applying a removal force to the portable computing tablet 200 to overcome the retention configuration provided by the flexible cantilevered retention element nib 577 and the respective flexible cantilevered retention element 576. It is understood that the portable computing tablet holster open end slot 572 and the portable computing tablet holster tablet securing end slot 574 can be of any suitable quantity and shape.

Each of the lateral support segments 552, 554, 556 would include like features forming a channel, the features being exemplified by the lateral retention distal segment 556, as illustrated in FIGS. 14 and 15. The lateral retention distal segment 556 is formed by a lateral retention element channel base segment 557 extending generally perpendicularly from a lateral edge of the base tablet rear support panel 532. A lateral retention element channel base segment 558 extends inward (towards a central region of the base tablet rear support panel 532) from a distal edge of the lateral retention element channel base segment 557. Collectively, the associated section of the base tablet rear support panel 532, the lateral retention element channel base segment 557, and the lateral retention element channel base segment 558 form a lateral retention element channel formation 559.

The handle assembly 510 generally includes a lower grip portion or handle 512 and a handle attachment section 518 extending from an assembly end of the handle 512. The handle 512 can include ribs or grooves 514 to facilitate grasping by a user.

In the exemplary embodiment, the portable computing tablet holster 500 additionally includes an independent camera 596 for capturing video images simultaneously with video images captured by the camera 296 of the portable computing tablet 200. A camera lens 597 of the camera 596 is provided on a non-viewing or recording side of the support member 518 and is spaced apart from the camera viewing aperture 570 in the portable computing tablet retention assembly 530 a predetermined distance to provide the desired separation between cameras 296, 596. The light emitting device 160 (FIG. 4) described above is located on the non-viewing or recording surface of the expanding tablet rear support panel 134. In the exemplary portable computing tablet holster 500, a light emitting device 560 is provided on a non-viewing or recording side of the support member 518. The articulating motion between the portable computing tablet retention assembly 530 and the handle assembly 510 additionally enables the user to orient the camera 296 of the portable computing tablet 200 and the integral camera 596 of the portable computing tablet holster 500 to simultaneous capture images from two different directions. Another important advantage of the pivoting motion and the rotating motion provided by the articulating assembly is that such rotation motion and/or pivoting motion enables differing angles between the camera 296 of the portable computing tablet 200 and the integral camera 596 provided on the handle assembly 510 of the portable computing tablet holster 500. This separation and flexibility introduces a capability to the user enabling more creativity when capturing still and/or video images. Importantly, this also allows for flexibility of the viewing angles of the cameras 269, 569 with respect to one another. In addition, the introduction of the camera 569 onto the handle 512 enables the user to capture still and/or video images in one direction, while the display of the portable computing tablet 200 can be oriented at a different angle. This enables ease of viewing of the display upon the portable computing tablet 200, while enabling recording of stills and/or video from a different angle. Another advantage of the two cameras 269, 569 is an introduction of recording three-dimensional still and/or video images.

A touch screen controller input device 562 is located at a location preferably accessible by a user's thumb on the viewing side of the handle assembly 510. The touch screen controller input device 562 is provided to receive user inputs, which are conveyed to the portable computing tablet 200 through a wired connection or a wireless communication link. The touch screen controller input device 562 is preferably located at a position just above the assembly end of the handle 512 to allow operation of the touch screen controller input device 562 by a thumb of the user's gripping hand or finger of the user's free hand.

Although the portable computing tablet holster 500 is shown having three lateral retention segments 552, 554, 556, it is understood that the lateral retention channel can be a single, continuous element, similar to the base elongated retention element 542 and the tablet holster frame first retention channel 544. As illustrated, the lateral retention base segment 552 is continuous with the base elongated retention element 542. Similarly, the lateral retention distal segment 556 is continuous with the distal elongated retention element 546. In one variant, the lateral retention channel can be continuous with each of the base elongated retention element 542 and the distal elongated retention element 546, creating one single retention channel routing along each of the pair of elongated edges of the portable computing tablet retention assembly 530 and the retaining lateral edge of the portable computing tablet retention assembly 530.

Figure 16:
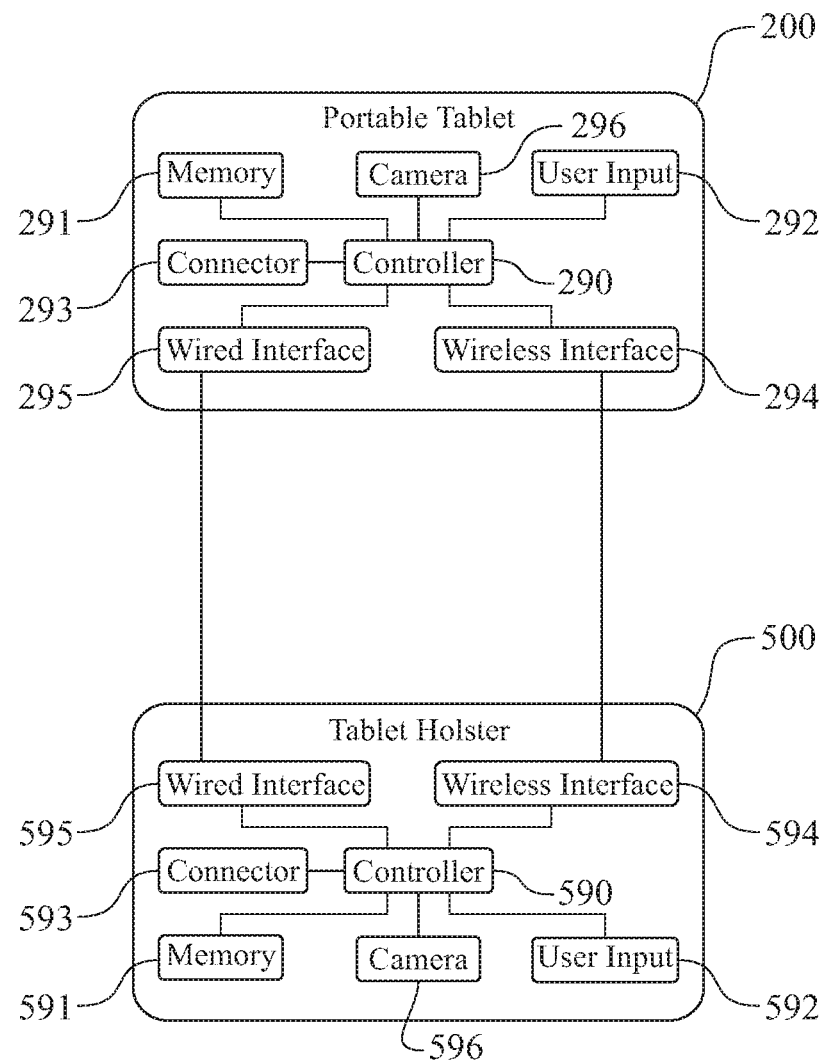
FIG. 16 presents an exemplary schematic diagram introducing functional components of the portable computing tablet holster and functional components portable computing tablet of FIG. 8, the illustration additionally introducing interactions between the functional components of each assembly as well as interactions between the assemblies.
Figure 17:
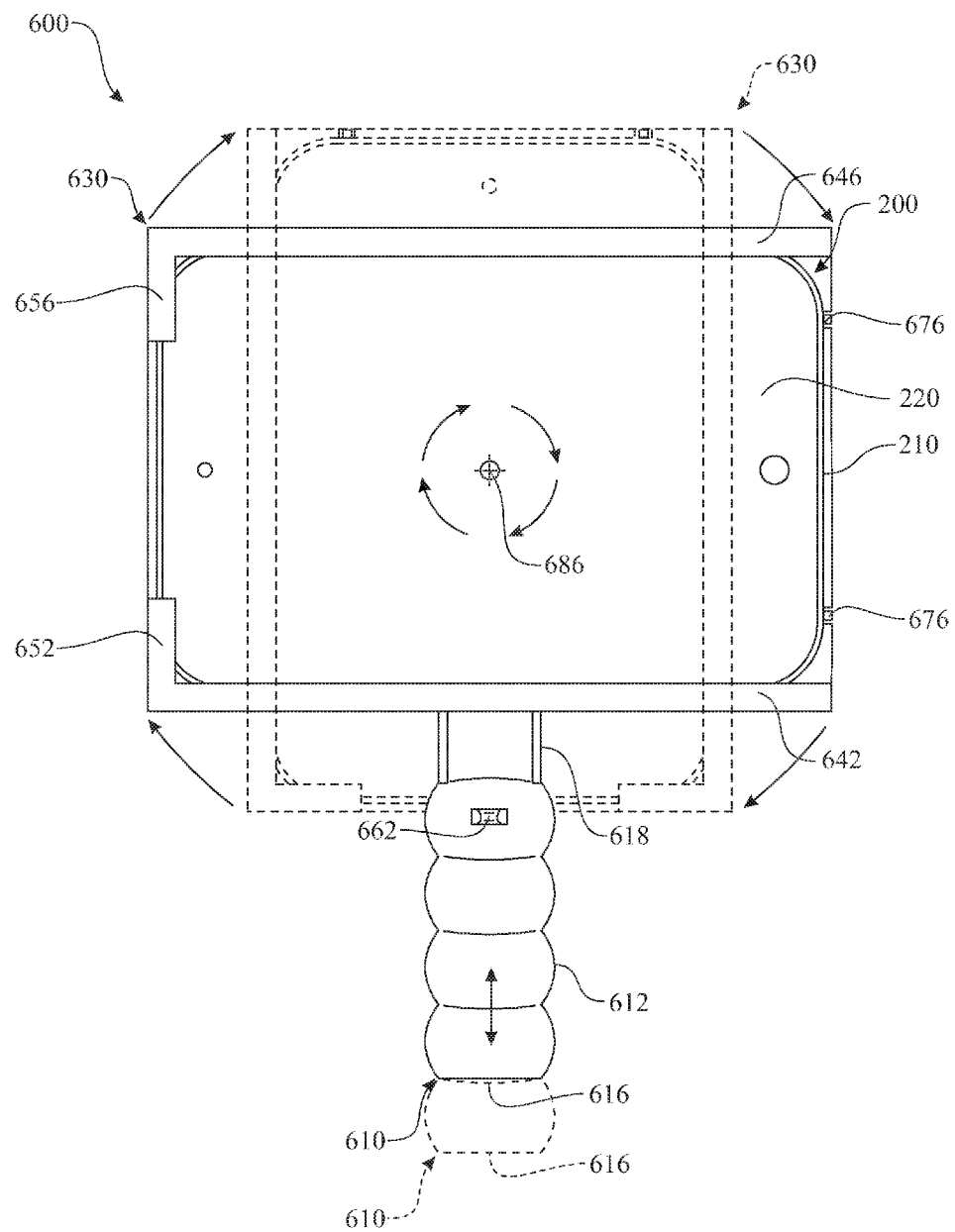
FIG. 17 presents an elevation viewing side view of a variant of the embodiment of the portable computing tablet holster originally introduced in FIG. 8, wherein the exemplary version includes a tablet/handle rotation feature and a handle sliding feature.

The variants and embodiments of the portable computing tablet holster disclosed herein can include electrically operated circuitry and associated components, as detailed in FIG. 16. A controller 590 is provided in non-transient signal communication with any of a variety of functional components, including non-transient digital memory 591, one or more user input devices 592, one or more connectors 593, a wireless interface 594, a wired interface 595, a digital camera 596, and the like. The non-transient digital memory 591 can include integrated memory and or removable memory device. The removable memory device could be in wired communication by way of temporary electro-mechanically integrating the removable memory device into the circuit by a connector 593 or by way of a wireless communication. Examples of removable memory include universal serial bus (USB) memory sticks, secure digital (SD) memory cards, and the like. The wireless interface 594 includes wireless circuitry and operating protocol for wirelessly communicating with other devices, including the portable computing tablet 200 or any other suitable device. The wireless circuitry and operating protocol can include Wi-Fi, Bluetooth, Zigbee, Near Field Communications (NFC), and the like. The wired interface 595 includes wired circuitry, connectors 593 and operating protocol for directly communicating with other devices, including the portable computing tablet 200 or any other suitable device. The wired circuitry and operating protocol can include a serial communication, such as a Universal Serial Bus (USB), a parallel communication, Ethernet, and the like. The camera 596, secondary light emitting device 560, and other connectors 593 are in electrical and/or signal communication with the controller 590 using any suitable electrical and/or signal carrying medium, such as wires, a flexible circuit, fiber optic strands, and the like. The user input 592 can be a touch pad/screen, a contact switch, and the like. Connectors 593 can be provided for any of a variety of functions, including signal communication links, power supplies (for recharging of the portable power supply), receiving the SD memory card, and the like. Power to the electronic circuitry and components would be provided by a portable power supply, such as a battery, a super capacitor, a power generating device (such as a solar energy converter, a kinetic energy converter, etc.), and the like.

The exemplary portable computing tablet holster 500 includes at least one lateral retention segment 552, 554, 556, along a first lateral edge of the portable computing tablet retention assembly 530, and at least one flexible cantilevered retention element 576 proximate a second, opposite lateral edge of the portable computing tablet retention assembly 530. In an alternative configuration, the portable computing tablet retention assembly 530 can be configured replacing the at least one lateral retention segment 552, 554, 556 with at least one flexible cantilevered retention element 576 located along the first lateral edge of the portable computing tablet retention assembly 530, wherein the at least one flexible cantilevered retention element 576 retains the portable computing tablet 200 within the portable computing tablet retention assembly 530 in each direction parallel to the elongated retention elements 542, 546.

In a lower tier version, the modified portable computing tablet holster 500 would include a handle assembly 510 that is fixed to the portable computing tablet retention assembly 530. In the modified portable computing tablet holster 500, the handle assembly 510 and the portable computing tablet retention assembly 530 can be manufactured using a single mold; the modified portable computing tablet holster 500 having a unitary molded construction. This provides a low cost solution for the consumer market.

The portable computing tablet 200 includes like components. Like elements of the portable computing tablet 200 and portable computing tablet holster 500 are numbered the same except preceded by the numeral '2'. Communication between the portable computing tablet holster 500 and the portable computing tablet 200 can be accomplished by a wired interface provided between the wireless interface 595 of the portable computing tablet holster 500 and the wireless interface 295 of the portable computing tablet 200 and/or a wireless interface provided between the wired interface 594 of the portable computing tablet holster 500 and the wired interface 294 of the portable computing tablet 200.

It is understood that a software application can be stored in memory 591 that includes a computer instruction set, executed by the controller 590. The computer instruction set can be employed to operate the integrated camera 596 and the light emitting device 560, when required. The circuitry can include a light sensor (not shown) to aid in determining when the use of the light emitting device 560 is required. The electrical circuitry of the portable computing tablet holster 500 can be such to operate the integrated camera 596 with or without the portable computing tablet 200. Greater creativity can be achieved in producing videos by combining the portable computing tablet 200 with the portable computing tablet holster 500. For example, a user can selectively alternate between utilizing video captured by the camera 596 on the tablet holder 500 and utilizing video captured by the camera 296 on the portable computing tablet 200 in accordance with a user desired video capturing angle.

The portable computing tablet holster 500 introduces a device capable of rotating the portable computing tablet retention assembly 530 and pivoting the portable computing tablet retention assembly 530 about an attachment end of the handle assembly 510. The rotation of a portable computing tablet retention assembly 530 having a rectangular shape can interfere with the user's hand on the handle assembly 510. A portable computing tablet holster 600, illustrated in FIG. 17 through 20, is an enhanced variant of the portable computing tablet holster 500. The portable computing tablet holster 600 and the portable computing tablet holster 500 include a number of like features. The portable computing tablet holster 600 and the portable computing tablet holster 500 are numbered the same except preceded by the numeral '6', unless indicated as otherwise. The portable computing tablet holster 600 introduces a system for sliding a handle assembly 610 to position locating a handle 612 of the handle assembly 610 at a desired distance from a respective edge of a portable computing tablet retention assembly 630, as indicated by a linear arrow. The portable computing tablet holster 600 additionally retains the capability for rotating the portable computing tablet retention assembly 630 about a ratchet rotation disk 686 attached to an attachment end of a handle attachment section 618 of the handle assembly 610, as indicated by a series of arched arrows. Portions of the illustration shown in broken lines indicate an original position of the respective element and portions of the illustration shown in solid lines indicates the current configuration of the portable computing tablet holster 600.

Figure 18:
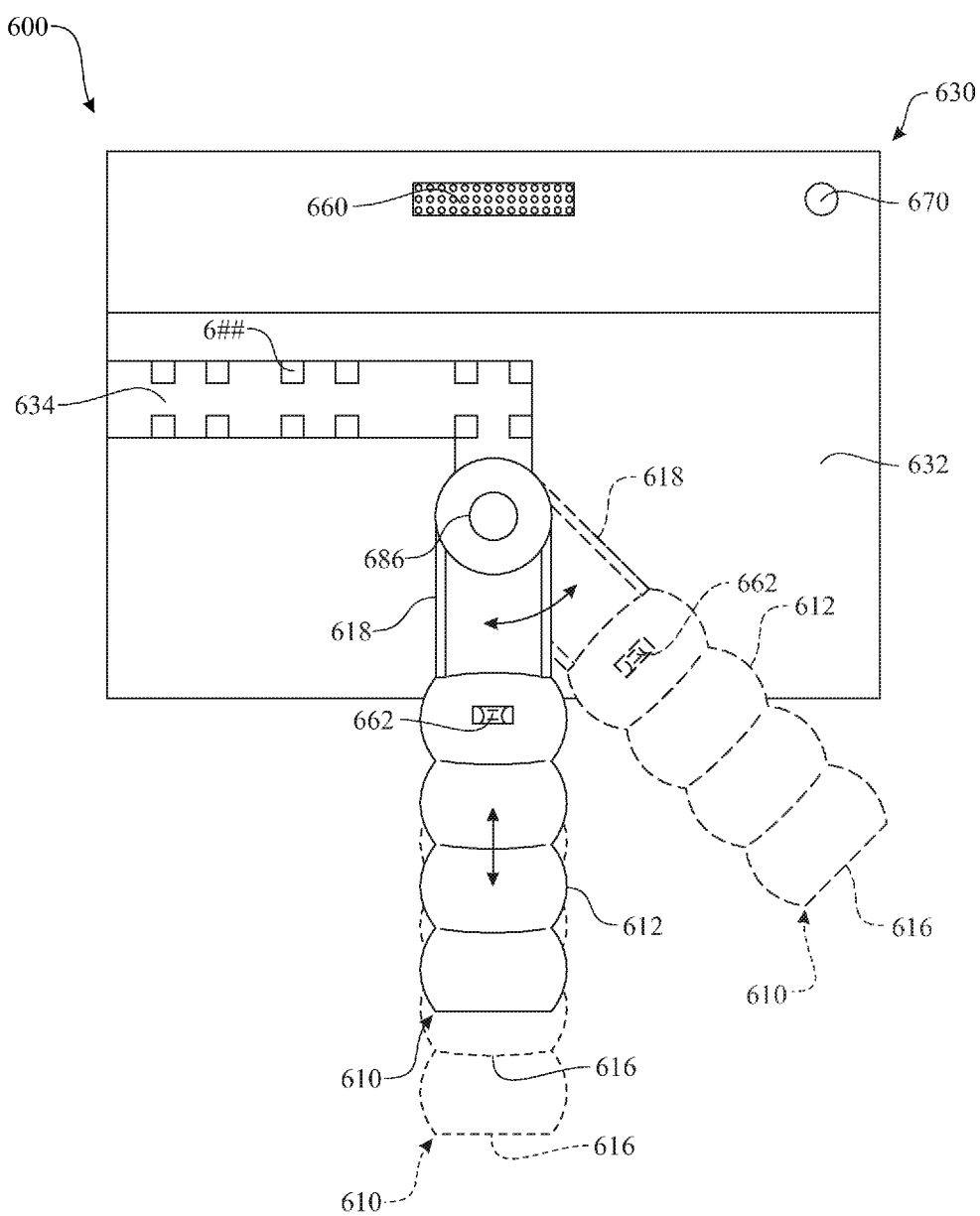
FIG. 18 presents a non-viewing side elevation view of the portable computing tablet holster originally introduced in FIG. 17, the illustration demonstrating movements associated with the tablet/handle sliding feature and the tablet/handle rotation feature.
Figure 19:
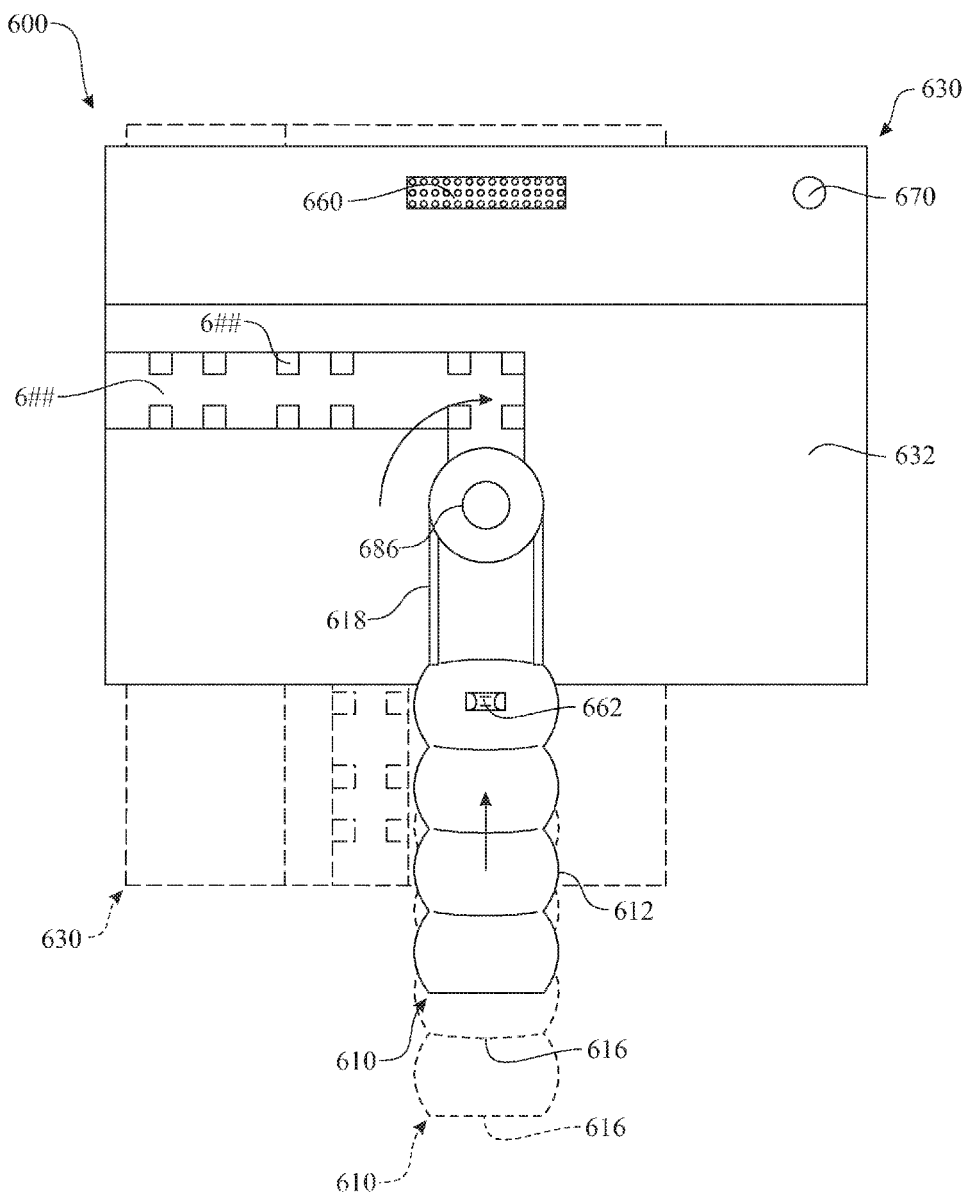
FIG. 19 presents a non-viewing side elevation view of the portable computing tablet holster originally introduced in FIG. 17, the illustration demonstrating alternative movements associated with the tablet/handle sliding feature and the tablet/handle rotation feature.
Figure 20:
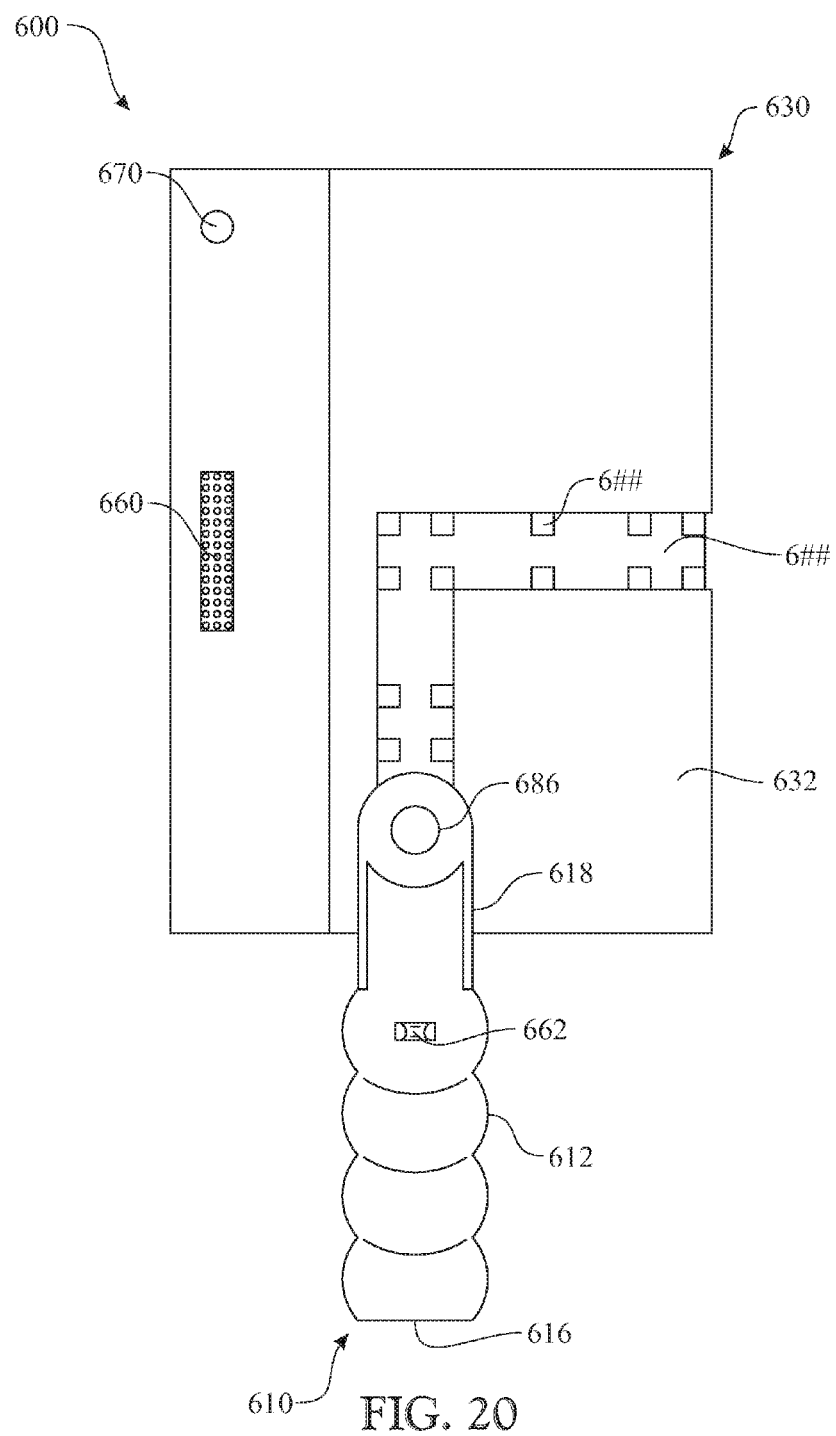
FIG. 20 presents a non-viewing side elevation view of the portable computing tablet holster originally introduced in FIG. 17, the illustration demonstrating another available configuration of the portable computing tablet holster.
Figure 22:
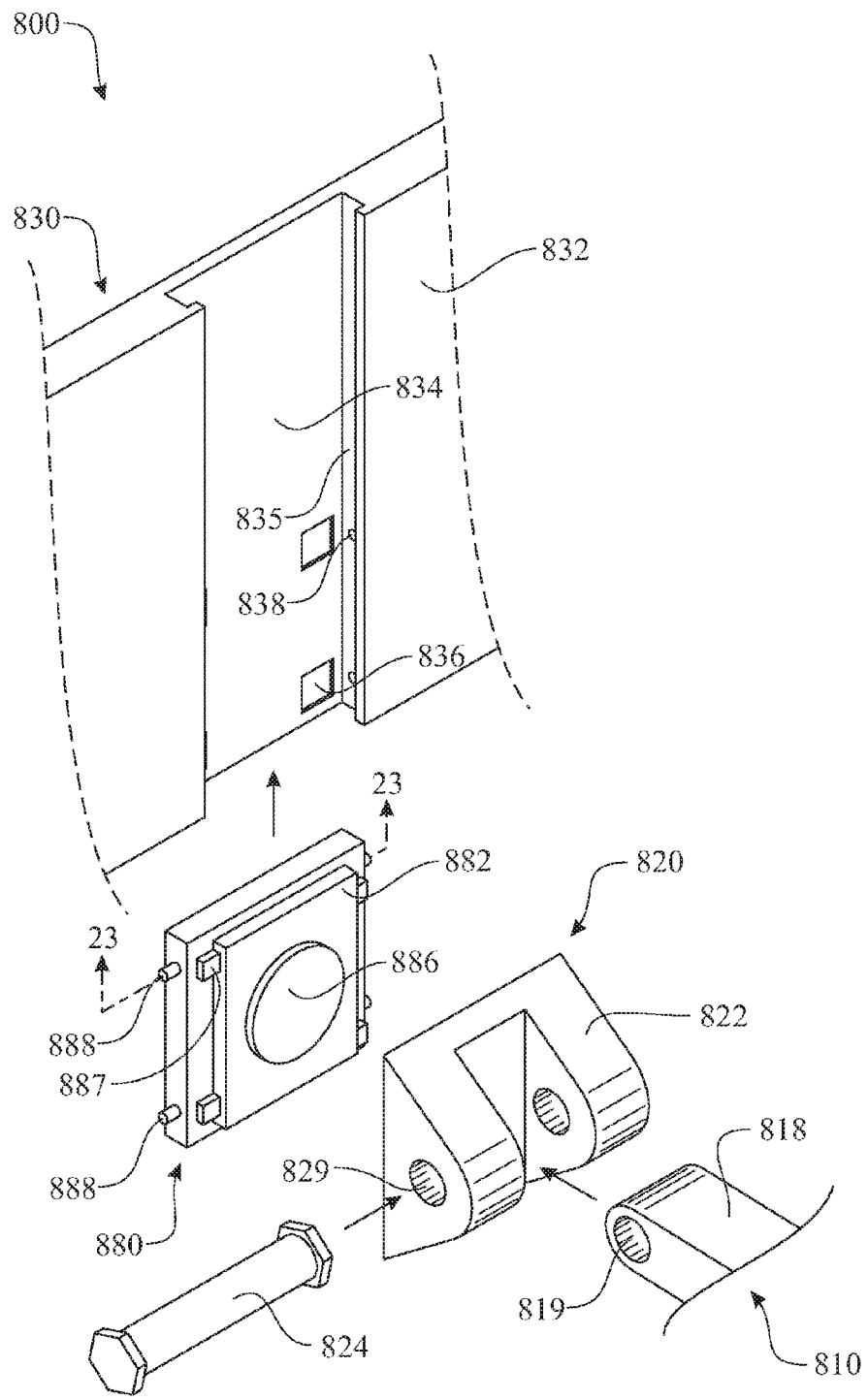
FIG. 22 presents an exploded isometric non-viewing side view of a portion of yet another variant of the portable computing tablet holster originally introduced in FIG. 17, the illustration introducing components enabling the tablet rotation feature, the handle sliding feature and a handle pivot feature.
Figure 23:
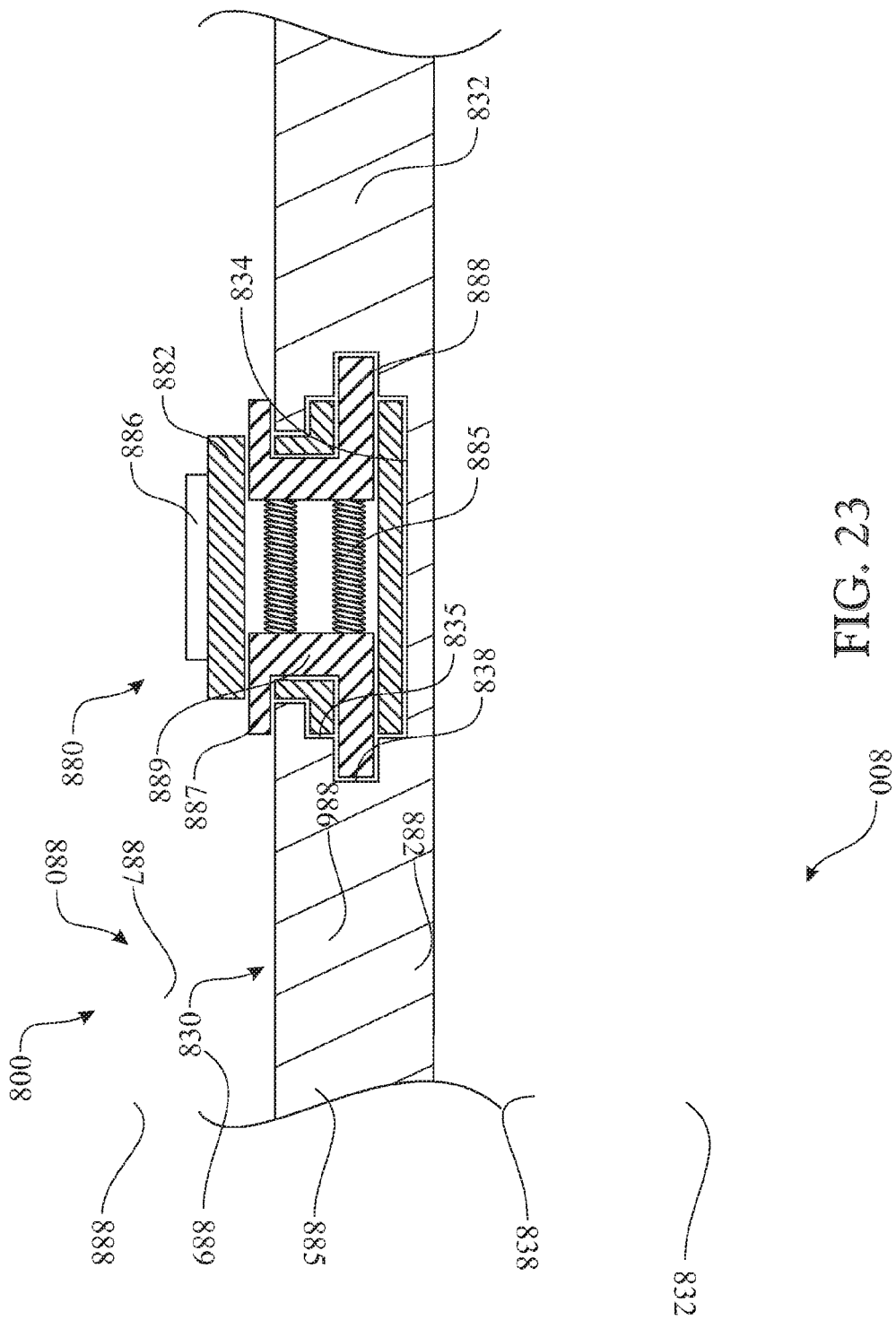
FIG. 23 presents a cross section view of one exemplary slide locking feature, the section being taken along section line 23-23 of FIG. 22.

The sliding system can utilize any sliding interface for slideably assembling an assembly end of the handle attachment section 618 to a non-viewing side of the portable computing tablet retention assembly 630. The sliding motion being along a plane that is substantially parallel to a plane defined by a viewing surface of the portable computing tablet 200. The exemplary sliding system employs a sliding mechanism slideably engaging within a handle sliding mechanism receiving slot 634. As illustrated in FIGS. 18 through 20, the handle sliding mechanism receiving slot 634 can include a longitudinal segment extending parallel to an elongated edge of the portable computing tablet retention assembly 630 and a lateral segment extending perpendicular to the elongated edge of the portable computing tablet retention assembly 630. It would be desired that the point of intersection between the longitudinal segment and the lateral segment would be centered within the non-viewing surface of a base tablet rear support panel 632 of the portable computing tablet retention assembly 630. The sliding system can include a detent locking system enabling retention of the sliding interface at any of a series of predetermined positions along the longitudinal segment or the lateral segment of the handle sliding mechanism receiving slot 634. Details of one exemplary sliding system configuration are shown in FIGS. 22 and 23 later herein.

A rotating motion can be provided by the ratchet rotation disk 686. A rotating motion enables a rotational motion of the handle assembly 610 and the portable computing tablet retention assembly 630 respective to one another as identified by an arched arrow shown in FIGS. 17 and 18. The rotational motion being about an axis that is substantially perpendicular to the viewing surface of the portable computing tablet 200. The ratchet rotation disk 686 can be any suitable rotational mechanism, such as the ratchet rotation disk 586, previously described herein, a pivot axle or pin, and the like. The rotational mechanism can include any suitable rotational elements known by those skilled in the art, or those introduced herein.

The portable computing tablet holster 600 additionally includes a light emitting device 660 operated by an actuation switch 662. The exemplary light emitting device 660 includes a bank of high output light emitting diodes. The light emitting device 660 and the actuation switch 662 are similar to the light emitting device 160 and the actuation switch 162 previously described herein. A portable power supply would be integrated into an enclosure within the handle 612, within an enclosure carried by the base tablet rear support panel 632, or an enclosure carried by any other feature of the portable computing tablet holster 600. The power would be conveyed between the portable power supply, the actuation switch 662 and the light emitting device 660 by any suitable electrically conductive material forming an electrically conductive path therebetween. Examples include wires, a flexible circuit, conductive tape, connectors, a printed circuit board, and the like. It is understood that wireless power transmission can be employed using any suitable wireless power transmission configuration known by those skilled in the art. In one alternative, compact configuration, the actuation switch 662 and the portable power supply would be integrated into the light emitting device 660. The user would toggle the actuation switch 662 to activate and deactivate the light emitting device 660. In another alternative, compact configuration, the actuation switch 662 can be a motion sensing switch, wherein the actuation switch 662 and the portable power supply would be integrated into the light emitting device 660. The user would move the portable computing tablet holster 600 to activate the light emitting device 660. Although the light emitting device 660 is shown being assembled to the non-viewing side of the base tablet rear support panel 632, it is understood that the light emitting device 660 can be integrated into any suitable portion of the handle assembly 610.

The portable computing tablet holster 600 can include any of the features of the previously described versions, such as an integrated camera light emitting device 560 of the portable computing tablet holster 500, the pivoting feature provided by the pivotal motion of the hinged support arm 582 respective to the handle attachment section 518, and the like.

Figure 21:
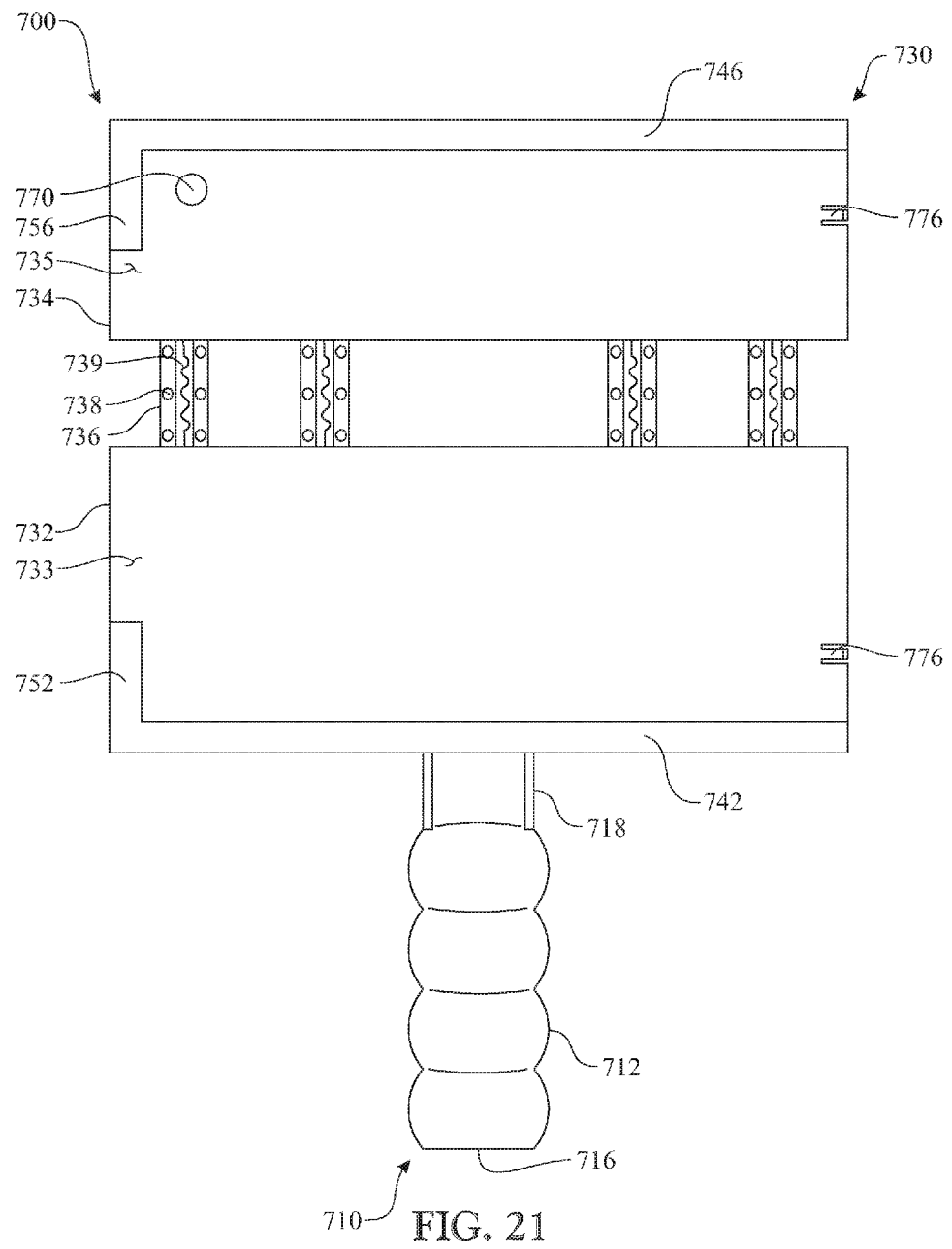
FIG. 21 presents a viewing side elevation view of another variant of the portable computing tablet holster originally introduced in FIG. 8, wherein the exemplary version introduces a portable computing tablet retention assembly expansion feature.

The portable computing tablet holster 100 included the base elongated retention element 142 and the distal elongated retention element 146 to accommodate a lateral dimension H of the portable computing tablet 200, as shown in FIGS. 1 through 5. Retention of the portable computing tablet 200 within the portable computing tablet retention assembly 130 is provided by friction. A portable computing tablet holster 700, illustrated in FIG. 21, introduces an adjustable portable computing tablet retention assembly 730 adapted to accommodate different portable computing tablets 200 having different lateral dimensions H. The portable computing tablet holster 700 combines the tablet retention features of the portable computing tablet holster 500 and the adaptive lateral dimension H provided by the portable computing tablet holster 100. The portable computing tablet holster 700 and the portable computing tablet holster 100 include a number of like features. The portable computing tablet holster 700 and the portable computing tablet holster 100 are numbered the same except preceded by the numeral '7', unless indicated as otherwise. Additionally, the portable computing tablet holster 700 and the portable computing tablet holster 500 include a number of like features. The portable computing tablet holster 700 and the portable computing tablet holster 500 are numbered the same except preceded by the numeral '7', unless indicated as otherwise.

The portable computing tablet retention assembly 730 includes a distal elongated retention element 734 slideably assembled to a base tablet rear support panel 732 by a rear panel expansion sliding element 736. The sliding interface can be of any suitable height adjusting mechanism, including the height adjusting mechanism originally disclosed in FIGS. 3 through 5. In addition to comprising a base elongated retention element 742 and a distal elongated retention element 746, as originally taught by the portable computing tablet holster 100, the portable computing tablet holster 700 includes a lateral retention base segment 752 and a lateral retention distal segment 756, as originally taught by the portable computing tablet holster 500. The lateral retention base segment 752 and the lateral retention distal segment 756 retain the portable computing tablet 200 within the portable computing tablet retention assembly 730 in an insertion direction. The portable computing tablet holster 700 further comprises at least one flexible cantilevered retention element 776, as originally taught by the portable computing tablet holster 500, to retain the portable computing tablet 200 within the portable computing tablet retention assembly 730 in a removal direction. A camera viewing aperture 770 provides access to the camera 296 of the portable computing tablet 200 through the distal elongated retention element 734 for viewing the desired image to be captured. The camera viewing aperture 770 can be of any suitable shape and size to accommodate different locations of cameras 296 of different portable computing tablets 200. The camera viewing aperture 770 can be shaped and sized to additionally accommodate a light emitting device (not shown) that might be integrated into the portable computing tablet 200. Alternatively, a separate orifice can be included to accommodate the light emitting device (not shown) integrated into the portable computing tablet 200. It is recognized that these features could be included in any of the other versions, where applicable.

The exemplary portable computing tablet holster 600 includes the system for sliding the handle assembly 610 along a path formed on a non-viewing side of the portable computing tablet retention assembly 630. The portable computing tablet holster 600 additionally includes the capability for rotating one of the handle assembly 610 and the portable computing tablet retention assembly 630 respective to the other. A portable computing tablet holster 800 retains the sliding motion and rotational motion capabilities and introduces a pivoting capability. An exploded view introducing the operational components of the portable computing tablet holster 800 is illustrated in FIG. 22; with a cross section view detailing components of a sliding, locking mechanism is illustrated in FIG. 23. The portable computing tablet holster 800 and the portable computing tablet holster 600 include a number of like features. The portable computing tablet holster 800 and the portable computing tablet holster 600 are numbered the same except preceded by the numeral '8', unless indicated as otherwise.

A handle sliding mechanism 880 is adapted to slide within a handle sliding mechanism receiving slot 834 formed within a non-viewing side of a tablet rear support panel 832. The handle sliding mechanism 880 can be temporarily fixed in a predetermined location by engaging a locking element of the handle sliding mechanism 880 and a receiving feature formed within the handle sliding mechanism receiving slot 834. A handle sliding mechanism body 882 of the handle sliding mechanism 880 is sized and shaped to slideably assemble into a handle sliding mechanism receiving slot 834, more specifically, having elongated edges that are sized to slideably assembly within a handle sliding mechanism receiving edge channel 835 of the handle sliding mechanism receiving slot 834.

The exemplary illustration introduces two optional locking configurations. A first exemplary locking mechanism includes a pliant feature extending downward from a bottom surface of a handle sliding mechanism body 882 of the handle sliding mechanism 880. The pliant feature engages and disengages with a handle sliding mechanism detent compression recessions 836 formed in a bottom surface of the handle sliding mechanism receiving slot 834. The pliant feature can be of any suitable configuration. A second exemplary locking mechanism includes a series of handle sliding mechanism retention featured 888, which are retained in an expanded condition by a handle sliding mechanism retention feature biasing element 885, as illustrated in FIG. 23. Each handle sliding mechanism retention feature 888 engages and disengages with a respective handle sliding mechanism detent lateral bores 838 formed within the handle sliding mechanism receiving edge channel 835 of the handle sliding mechanism receiving slot 834. Operation of the handle sliding mechanism retention feature 888 is accomplished by applying a compression force to a handle sliding mechanism retention feature operating mechanism 887. The handle sliding mechanism retention feature 888 and handle sliding mechanism retention feature operating mechanism 887 are connected by a handle sliding mechanism retention feature connecting arm 889 and preferably fabricated as a single locking mechanism member having a unitary construction. The handle sliding mechanism body 882 includes cavities and bores to moveably receive each of the locking mechanism members and the handle sliding mechanism retention feature biasing element 885.

A handle sliding mechanism pivot enabling element 886 is carried by the handle sliding mechanism body 882. The handle sliding mechanism pivot enabling element 886 is rotationally assembled to a mating surface of the articulating interface subassembly 820. The handle sliding mechanism pivot enabling element 886 enables the rotational movement of the portable computing tablet retention assembly 830 and the handle assembly 810 respective to one another. The handle sliding mechanism pivot enabling element 886 can be any suitable rotation enabling configuration, including those described above as well as rotation enabling configurations known to those skilled in the art. The articulating interface subassembly 820 contributes to both the rotational motion and the pivotal motion between the handle assembly 810 and the portable computing tablet retention assembly 830. The pivotal motion is provided by a hinge assembly comprising an articulating subassembly pivot pin 824, which is inserted through a pair of central articulating element pivot pin receiving bores 829 formed through arms of a central articulating element 822 of the articulating interface subassembly 820 and a hinge tab bore 819 formed through an handle attachment section 818 of the handle assembly 810.

Although the exemplary hinge assembly illustrated in FIG. 22 is a common hinge configuration, it is understood that any suitable hinge configuration can be integrated herein, including those described herein and any suitable hinge configuration known by those skilled in the art. Additionally, the hinge assembly can include a position retention feature, such as a compression mechanism, which would increase friction between an interior surface of the arms of the central articulating element 822 and the mating surfaces of the handle attachment section 818. In another configuration, the hinge assembly can include a series of radially arranged teeth and mating grooves to limit the rotation when the teeth and mating grooves engage with one another. The hinge assembly can include any other position retention feature known by those skilled in the art.

Figure 24:
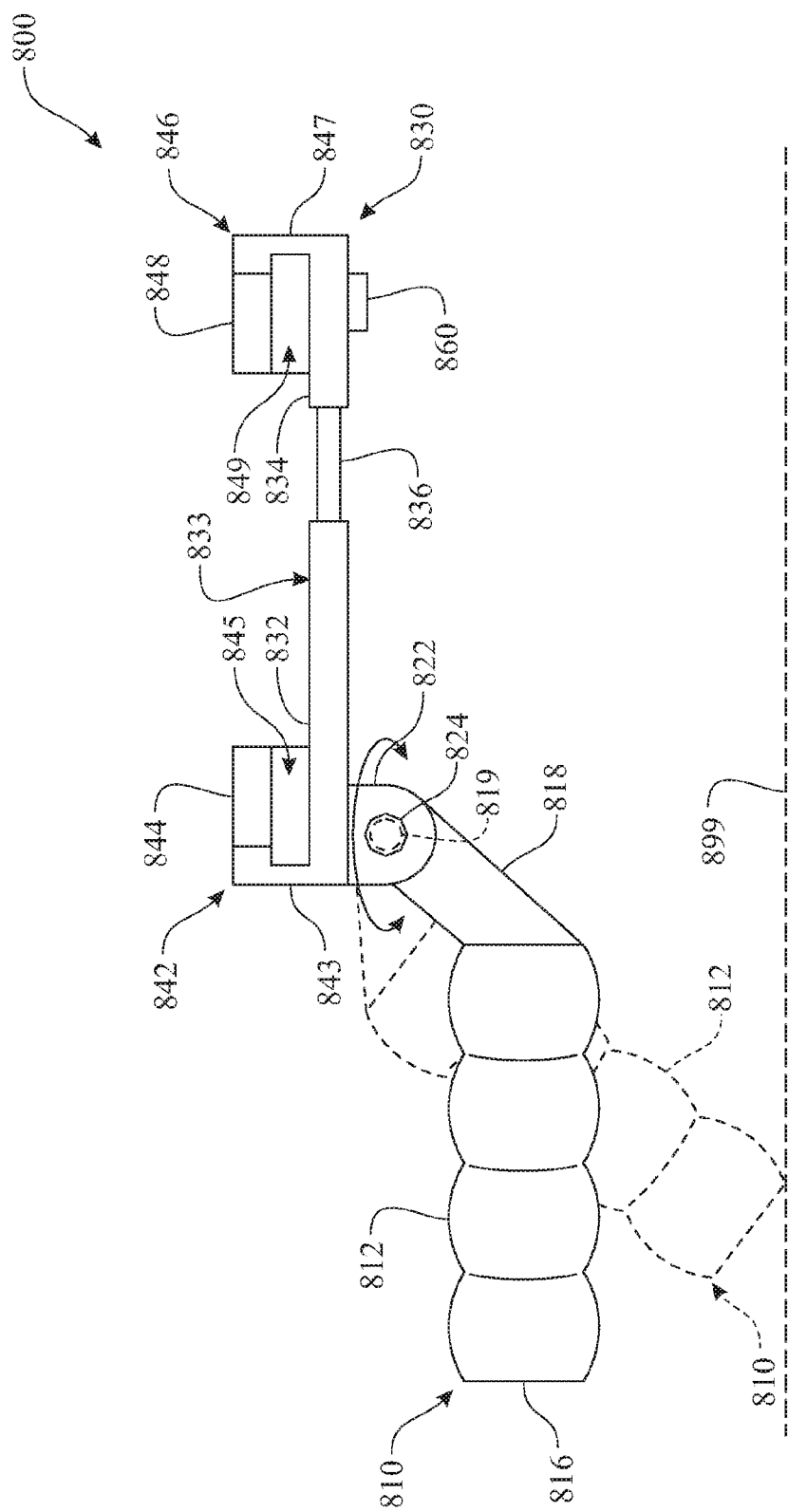
FIG. 24 presents a side elevation view of another variant of the portable computing tablet holster originally introduced in FIG. 23, the illustration demonstrating a first step using the tablet/handle rotation feature for orienting the handle into a stand configuration.
Figure 25:
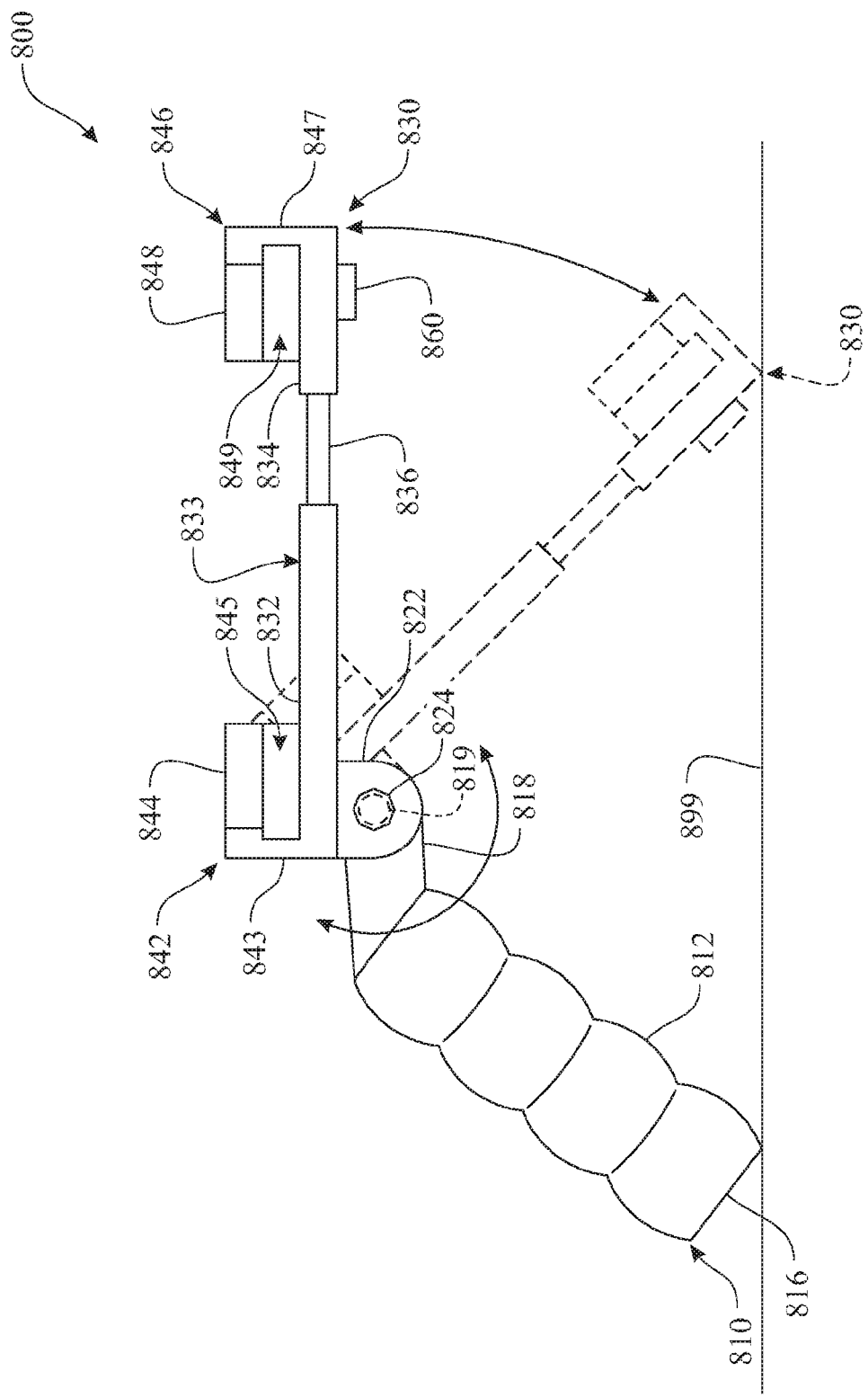
FIG. 25 presents a side elevation view of the portable computing tablet holster originally introduced in FIG. 23, the illustration demonstrating a second step using the tablet/handle pivot feature to orient the handle into a stand configuration.
Figure 26:
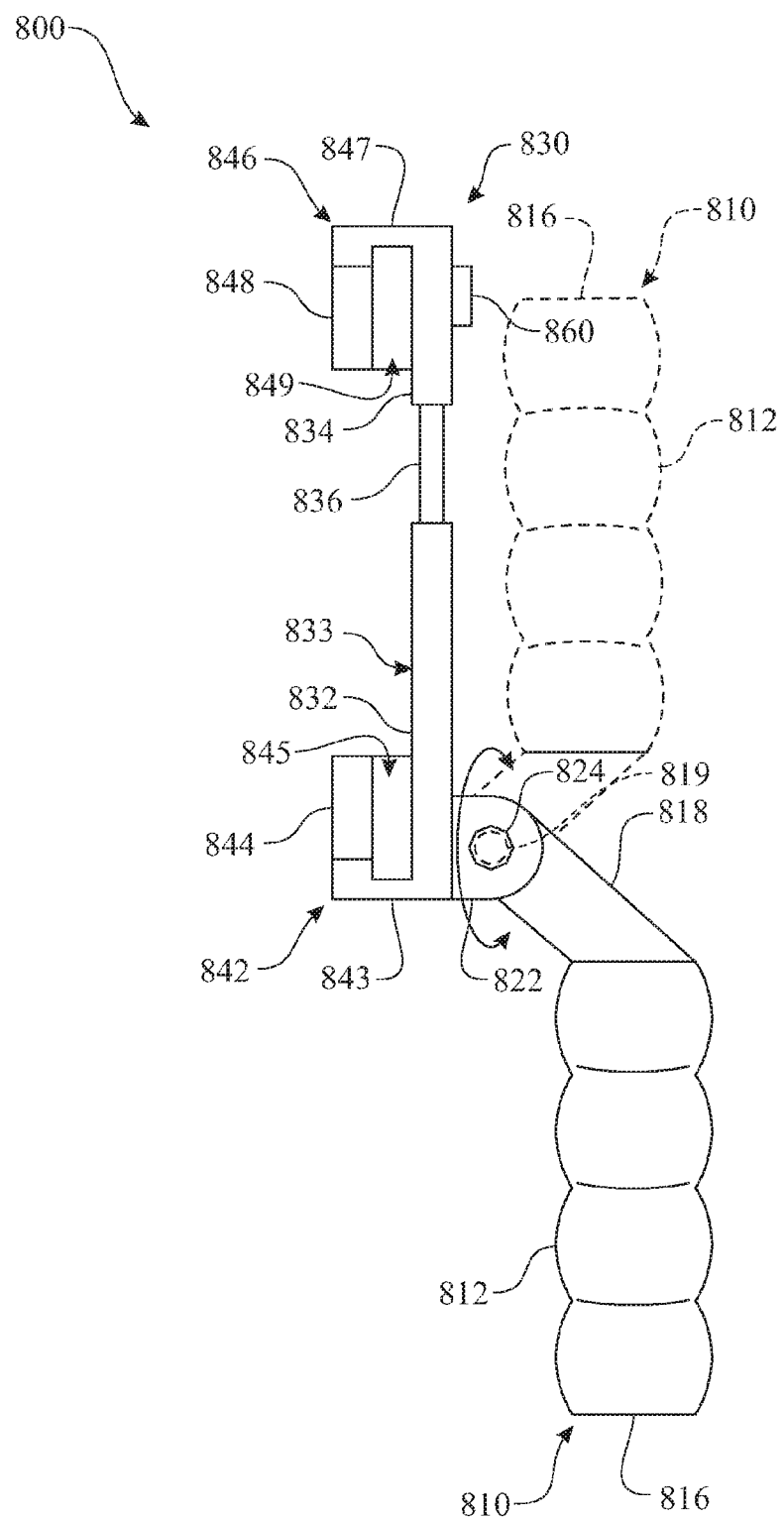
FIG. 26 presents a side elevation view of the portable computing tablet holster originally introduced in FIG. 23, the illustration demonstrating a step using the tablet/handle rotation feature for orienting the handle into a storage configuration.

Various applications of the articulating assembly of portable computing tablet holster 800 are illustrated in FIGS. 24 through 26. The handle attachment section 818 can include a section that is angled respective to an elongated axis of the handle 812. The angled section of the handle attachment section 818 provides an offset between the handle assembly 810 and the portable computing tablet retention assembly 830. The handle assembly 810 can be rotated about the handle sliding mechanism pivot enabling element 886, as illustrated in FIG. 24. The rotational motion illustrated reconfigures the handle assembly 810 from an orientation having the elongated axis of the handle assembly 810 being parallel to a plane defined by the tablet rear support panel 832 (shown in solid lines) to an orientation where the elongated axis of the handle assembly 810 is angled offset from parallel respective to the plane defined by the tablet rear support panel 832 (shown in broken lines). From this configuration, the portable computing tablet retention assembly 830 can be pivoted about the hinge tab bore 819 into a configuration where the portable computing tablet holster 800 is supported by a generally horizontally oriented support surface 899 (shown in broken lines). The portable computing tablet holster 800 would be supported by a distal edge of an handle sliding mechanism receiving slot 834 (or a distal edge of the tablet rear support panel 832 when the portable computing tablet retention assembly 830 excludes an expansion feature, represented by a handle sliding mechanism detent compression recessions 836) and a contacting portion of a distal, free handle end 816 of the handle 812, as illustrated in FIG. 25.

Alternatively, initiating from the configuration illustrated in FIG. 24, the handle assembly 810 can be rotated about the handle sliding mechanism pivot enabling element 886 from the extended configuration into a compact configuration, as illustrated in broken lines in FIG. 26). The portable computing tablet holster 800 can be placed into the compact configuration for compact applications, for storage, or any other suitable use. The illustrated examples are only a portion of the functions provided by the articulated assembly. It is understood that the articulated assembly can be used for any suitable function desired by the user. The inclusion of a multi-directional slot (similar to the handle sliding mechanism receiving slot 634) enables a slideable positioning of the handle assembly 810 to any of a variety of positions along the multi-directional slot. This furthers the optional configurations and resulting functions provided by the slideably articulated assembly.

Figure 27:
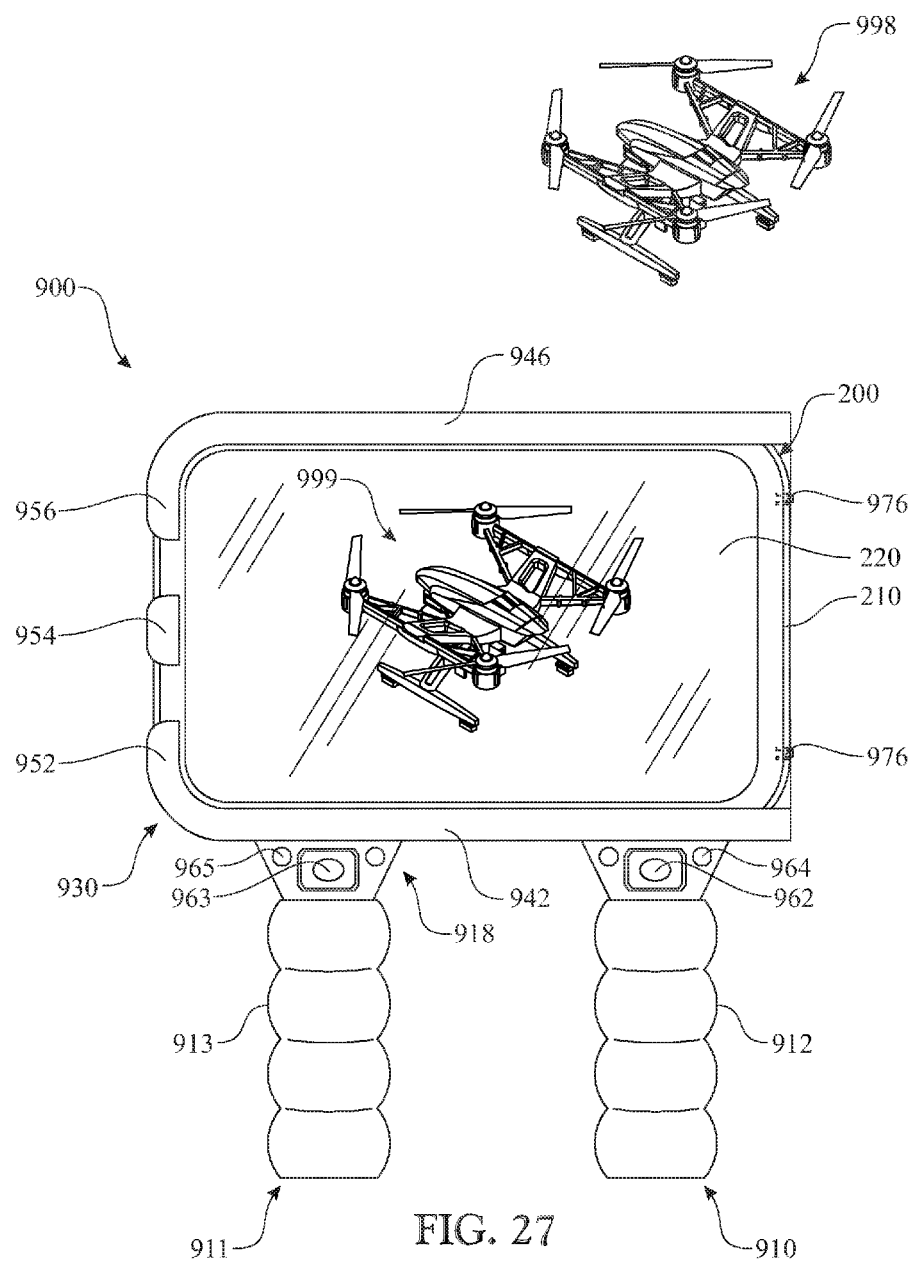
FIG. 27 presents a viewing side elevation view of another variant of the portable computing tablet holster originally introduced in FIG. 8, wherein the exemplary version includes a pair of handles, the portable computing tablet holster being adapted to support a remote control of a radio controlled vehicle.

Each of the above disclosed variants of the portable computing tablet holster include a single handle assembly. The single handle assembly would preferably be configured to remain positioned along a central line of the portable computing tablet retention assembly to ensure the portable computing tablet holster remains balanced when being supported by a single hand of the user. There are some applications where two handles would be beneficial. A portable computing tablet holster 900, introduced in FIG. 27, is a modified version of the portable computing tablet holster 500. The portable computing tablet holster 900 and the portable computing tablet holster 500 have a number of like features. Like features of the portable computing tablet holster 900 and the portable computing tablet holster 500 are numbered the same except preceded by the numeral '9'.

The portable computing tablet holster 900 includes a pair of handle assemblies 910, 911. The pair of handle assemblies 910, 911 is preferably rigidly assembled to the portable computing tablet retention assembly 930. User input devices are integrated into each handle assembly 910, 911. The user input devices can include at least one of a user directional input device 962, 963 and one or more handle user analog input devices 964, 965. The user directional input device 962, 963 can be any suitable multi-directional input device, including a touch pad, a joystick, a trackball, and the like. The analog input devices 964, 965 can be any suitable analog type device providing an open/closed signal, including a tactile switch, a pushbutton switch, a toggle switch, a throw switch, a popple switch, a rocker switch, a snap action switch, a slide switch, a thumbwheel, and the like. As illustrated, the portable computing tablet holster 900 can include one or more one or more handle user analog input devices 964, 965 integrated onto the viewing side of the handle 912, 913. One exemplary implementation of the portable computing tablet holster 900 is a wireless controller for operating a remotely operated vehicle 998. The user would support the portable computing tablet holster 900 using both hands, each hand grasping a respective handle 912, 913. The user would then use their thumb to provide inputs to the portable computing tablet 200 through the user input devices 962, 963, 964, 965. The inputs would be processed and forwarded as an instruction to the remotely operated vehicle 998. The camera (not shown) could be used to acquire images of the remotely operated vehicle 998 during use. The images of the remotely operated vehicle 998 would be displayed as a remotely operated vehicle image 999 upon the touch screen 220 of the portable computing tablet 200. Alternatively, a camera (not shown) can be attached to the remotely operated vehicle 998. Images captured by the camera attached to the remotely operated vehicle 998 can be recorded by the portable computing tablet 200 and/or displayed on the touch screen 220 of the portable computing tablet 200.

Figure 28:
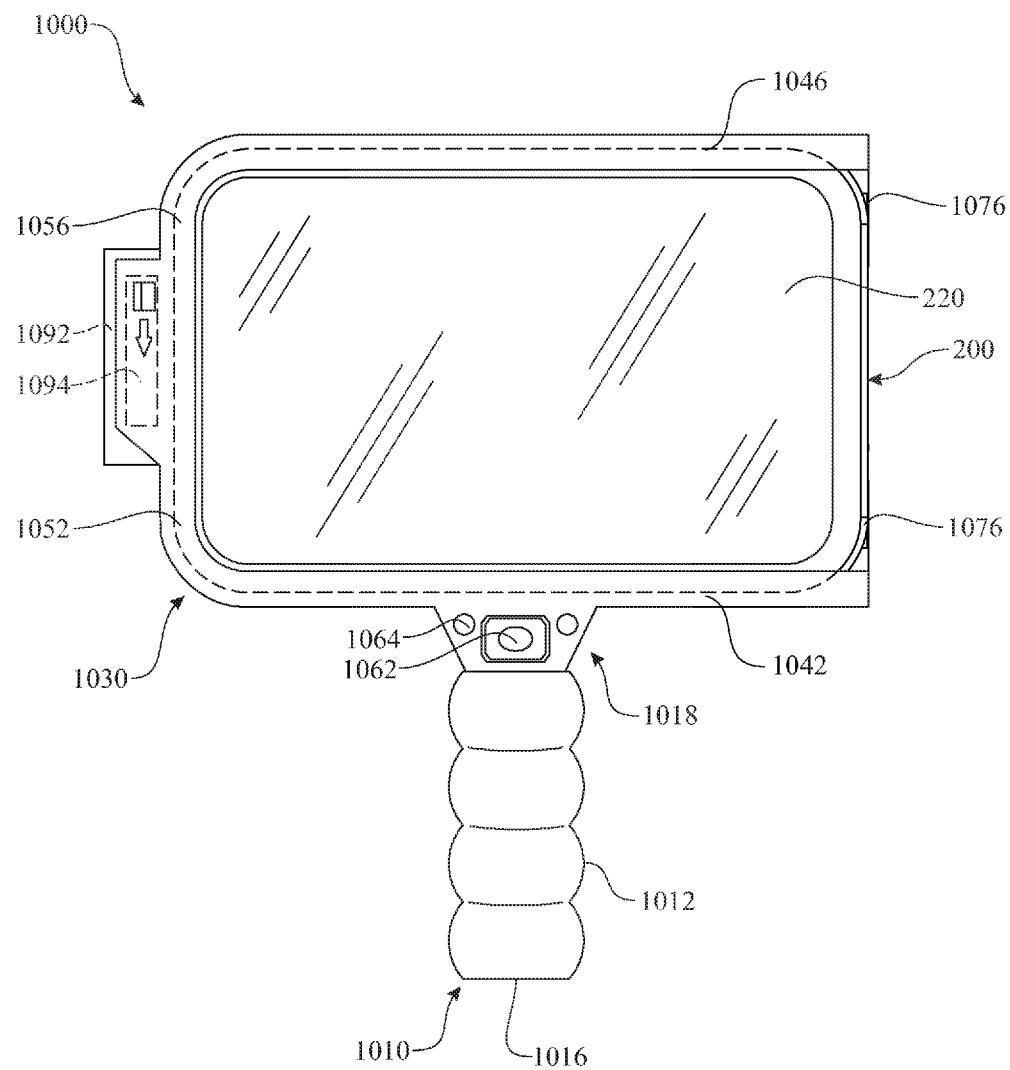
FIG. 28 presents a viewing side elevation view of yet another variant of the portable computing tablet holster originally introduced in FIG. 8, wherein the exemplary version introduces a magnetic strip reader, wherein the magnetic strip reader enables functionality such as a credit card processing feature.

The portable computing tablet holster can be adapted to acquire information from information cards. A portable computing tablet holster 1000, illustrated in FIG. 28, introduces an information card reading feature that can be incorporated into any of the variants disclosed herein. The exemplary portable computing tablet holster 1000 and the portable computing tablet holster 500 have a number of like features. Like features of the exemplary portable computing tablet holster 1000 and the portable computing tablet holster 500 are numbered the same except preceded by the numeral '10'. The exemplary information card reading feature 1092 includes an information card reading device 1094 embedded therein. The information card reading device 1094 would be determined by the type of card targeted for use in conjunction with the portable computing tablet holster 1000. The information card reading device 1094 can be a magnetic card reader, a near field card reader, a contact chip card reader, and the like.

It is understood that features from one variant can be incorporated into any of the other variants. For example, the portable computing tablet holster 700 can include a pair of handle assemblies handle assembly 710, similar to the portable computing tablet holster 900. In another example, the information card reader feature 1092 can be integrated into any of the portable computing tablet holsters 100, 300, 500, 600, 700, 800, 900. Using the portable computing tablet holster 100 as an example, the information card reader feature 1092 can be integrated into the base elongated retention element 142, enabling a wired communication between a controller circuit installed within the handle 112 and the information card reading device 1094. The information acquired from the information card is then forwarded to the portable computing tablet 200 using wired or wireless communication links.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

REFERENCE ELEMENTS

Ref No. Description
100 portable computing tablet holster
102 portable computing tablet holster viewing side
104 portable computing tablet holster non-viewing or recording side
110 handle assembly
112 handle
114 grip enhancing pliant material
116 distal, free handle end
118 handle attachment section
119 handle assembly fasteners
120 lanyard
130 portable computing tablet retention assembly
132 base tablet rear support panel
133 base rear support panel tablet contacting surface
134 expanding tablet rear support panel
135 distal rear support panel tablet contacting surface
136 rear panel expansion sliding element
138 rear panel extension detent feature
139 rear panel extension biasing element
142 base elongated retention element
143 base elongated retention element channel base segment
144 base elongated retention element channel rail segment
145 base elongated retention element channel formation
146 distal elongated retention element
147 distal elongated retention element channel base segment
148 distal elongated retention element channel rail segment
149 distal elongated retention element channel formation
152 rear panel extension biasing element
154 rear panel extension detent feature
160 light emitting device
162 actuation switch
193 connector
200 portable computing tablet
210 portable computing tablet housing
212 front, viewing surface
213 rear, non-viewing surface
214 first elongated edge
215 second elongated edge
216 first lateral edge
217 second lateral edge
220 touch screen
290 microprocessor
291 non-transient digital memory
292 user input device
293 connector
294 wireless interface
295 wired interface
296 camera
297 not used
300 portable computing tablet holster
310 handle assembly
312 handle
318 handle attachment section
320 lanyard
330 retention assembly
332 base tablet rear support panel
334 distal tablet rear support panel
342 base elongated retention element
370 pivot axle
372 pivot axle bore
402 viewing handle side
404 non-viewing handle side
410 handle assembly
412 handle
413 handle finger receiving formations
414 proximal handle finger receiving formation
416 distal, free handle end
417 proximal handle end
420 lanyard
422 distal lanyard loop
424 proximal lanyard loop
426 lanyard sizing loop slide bead
462 actuation switch
500 portable computing tablet holster
502 viewing handle side 504 non-viewing handle side
506 handle attachment interior surface
510 handle assembly
512 handle
514 handle grip enhancing feature
516 distal, free handle end
518 handle attachment section
519 hinge tab bore
530 portable computing tablet retention assembly
532 base tablet rear support panel
542 base elongated retention element
543 base elongated retention element channel base segment
544 tablet holster frame first retention channel
545 base elongated retention element channel formation
546 distal elongated retention element
547 distal elongated retention element channel base segment
548 distal elongated retention element channel rail segment
549 distal elongated retention element channel formation
552 lateral retention base segment
554 lateral retention central segment
556 lateral retention distal segment
557 lateral retention element channel base segment
558 lateral retention element channel base segment
559 lateral retention element channel formation
560 light emitting device
562 actuation switch
570 camera viewing aperture
572 portable computing tablet holster open end slot
574 portable computing tablet holster tablet securing end slot
576 flexible cantilevered retention element
576 flexible cantilevered retention element
577 flexible cantilevered retention element nib
580 articulating assembly
581 hinged support arm holster pivot surface
582 hinged support arm
583 hinged support arm holster hinged assembly surface
584 hinged support arm assembly edge
585 hinged support arm distal free edge
586 ratchet rotation disk
588 rotation disk ratchet teeth
589 hinge bore
590 controller
591 memory
592 user input device
593 connector
594 wired interface
595 wireless interface
596 integrated camera
600 portable computing tablet holster
610 handle assembly
612 handle
616 distal, free handle end
618 handle attachment section
619 hinge tab bore
630 portable computing tablet retention assembly
632 base tablet rear support panel
634 handle sliding mechanism receiving slot
636 handle sliding mechanism detent compression recessions
642 base elongated retention element
646 distal elongated retention element
652 lateral retention base segment
656 lateral retention distal segment
660 light emitting device
662 actuation switch
670 camera viewing aperture
676 flexible cantilevered retention element
686 ratchet rotation disk
700 portable computing tablet holster
710 handle assembly
712 handle
716 distal, free handle end
718 handle attachment section
719 hinge tab bore
730 portable computing tablet retention assembly
732 base tablet rear support panel
733 base rear support panel tablet contacting surface
734 distal elongated retention element
736 rear panel expansion sliding element
738 rear panel extension detent feature
739 rear panel extension biasing element
742 base elongated retention element
746 distal elongated retention element
752 lateral retention base segment
756 lateral retention distal segment
770 camera viewing aperture
776 flexible cantilevered retention element
800 portable computing tablet holster
810 handle assembly
812 handle
816 distal, free handle end
818 handle attachment section
819 hinge tab bore
820 articulating interface subassembly
822 central articulating element
824 articulating subassembly pivot pin
829 central articulating element pivot pin receiving bore
830 portable computing tablet retention assembly
832 tablet rear support panel
833 rear support panel tablet contacting surface
834 handle sliding mechanism receiving slot
835 handle sliding mechanism receiving edge channel
836 handle sliding mechanism detent compression recessions
838 handle sliding mechanism detent lateral bores
842 base elongated retention element
843 base elongated retention element channel base segment
844 tablet holster frame first retention channel
845 base elongated retention element channel formation
846 distal elongated retention element
847 distal elongated retention element channel base segment
848 distal elongated retention element channel rail segment
849 distal elongated retention element channel formation
850 rear panel expansion sliding element
860 light emitting device
880 handle sliding mechanism
882 handle sliding mechanism body
885 handle sliding mechanism retention feature biasing element
886 handle sliding mechanism pivot enabling element
887 handle sliding mechanism retention feature operating mechanism
888 handle sliding mechanism retention feature
889 handle sliding mechanism retention feature connecting arm
899 generally horizontally oriented support surface
900 portable computing tablet holster
910 first handle assembly
911 second handle assembly
912 first handle
913 second handle
918 handle attachment section
930 portable computing tablet retention assembly

29

932 base tablet rear support panel
933 base rear support panel tablet contacting surface
934 distal elongated retention element
942 base elongated retention element
946 distal elongated retention element
952 lateral retention base segment
954 rear panel extension detent feature
956 lateral retention distal segment
962 first user directional input device
963 second user directional input device
964 first handle user analog input device(s)
965 second handle user analog input device(s)
998 remotely operated vehicle
999 remotely operated vehicle image
1000 portable computing tablet holster
1010 handle assembly
1012 handle
1018 handle attachment section
1030 portable computing tablet retention assembly
1032 base tablet rear support panel
1033 base rear support panel tablet contacting surface
1034 distal elongated retention element
1042 base elongated retention element
1046 distal elongated retention element
1052 lateral retention base segment
1056 lateral retention distal segment
1062 user directional input device
1064 handle user tactile input device(s)
1092 information card reader feature
1094 information card reading device

What is claimed is:

1. A portable computing tablet holster adapted to support a portable computing tablet using one or both hands of a user, the portable computing tablet holster comprising:
 a portable computing tablet retention assembly including:
  a tablet holster frame rear panel having a first elongate edge, a second elongated edge opposite and parallel to the first elongate edge, a first lateral edge, wherein the first lateral edge extends between like first ends of the first elongate edge and the second elongate edge, a second lateral edge opposite and parallel to the first lateral edge, the second lateral edge extending between like second ends of the first elongate edge and the second elongate edge,
  a tablet holster frame first retention channel extending along at least a portion of the first elongate edge,
  a tablet holster frame second retention channel extending along at least a portion of the second elongate edge,
  each of the first retention channel and the second retention channel being designed to receive and retain a respective edge of the portable computing tablet, the first retention channel and the second retention channel are arranged facing one another, and
  the tablet holster frame rear panel segmented into a base tablet rear support panel and a distal tablet rear support panel in a manner to enable distal adjustment between the tablet holster frame first retention channel and the tablet holster frame second retention channel; and
  a width controlling mechanism connecting the base tablet rear support panel and the distal tablet rear support panel, the width controlling mechanism adapted to adjust a span between the first retention

30 channel and the second retention channel to accommodate different portable computing tablets of different dimensions,
 a handle having an attachment end and a distal, free end, the handle being attached to the tablet holster frame rear panel at the attachment end thereof, and
 an articulating mechanism assembling the tablet rear support panel and the handle assembly to one another, the articulating mechanism configured to enable at least one of:
  a) a sliding motion between the tablet rear support panel and the handle assembly respective to one another, the sliding motion being along an axis that is substantially parallel to a plane defined a viewing surface of the portable computing tablet when installed into the tablet rear support panel,
  b) a rotational motion between the tablet rear support panel and the handle assembly respective to one another, the rotational motion being about an axis that is substantially perpendicular to the plane defined the viewing surface of the portable computing tablet when installed into the tablet rear support panel, and
  c) a pivotal motion between the tablet rear support panel and the handle assembly respective to one another, the pivotal motion being along an axis that is substantially parallel to a plane defined a viewing surface of the portable computing tablet when installed into the tablet rear support panel and perpendicular to an elongated axis of the handle.

2. A portable computing tablet holster as recited in claim 1, the holster further comprising:
 a camera viewing aperture formed through the tablet holster frame rear panel, the camera viewing aperture being located to align with a camera of the portable computing device when the portable computing device is retained by the portable computing tablet retention assembly.

3. A portable computing tablet holster as recited in claim 1, the holster further comprising:
 a user input device integrated into the handle.

4. A portable computing tablet holster as recited in claim 1, the holster further comprising:
 at least one user input device integrated into the handle, wherein the at least one user input device is adapted to transfer a user's input from the at least one user input device to at least one of the portable computing device, a light emitting device integrated into the portable computing tablet holster, and a camera integrated into the portable computing tablet holster.

5. A portable computing tablet holster as recited in claim 1, the holster further comprising:
 at least one portable computing tablet holster end slot formed inward from a respective lateral edge of the tablet holster frame rear panel, wherein the at least one portable computing tablet holster end slot is adapted to provide access to the portable computing tablet enabling the user to at least one of:
  a) completely insert the portable computing tablet into the portable computing tablet retention assembly, and
  b) aid in an initial removal of the portable computing tablet from the portable computing tablet retention assembly.

6. A portable computing tablet holster as recited in claim 1, the holster further comprising:
 a controller;
 a portable power supply in electrical communication with the controller; and at least one of the following in signal communication with the controller:
a) a wired communication interface,
b) a wireless communication interface,
c) at least one connector,
d) a digital memory device,
e) a digital camera, and
f) a user input device.

7. A portable computing tablet holster as recited in claim 1, the holster further comprising:
a biasing element, wherein the biasing element is configured to draw the base tablet rear support panel and the distal tablet rear support panel towards one another to apply a compressive retention force to each respective edge of an inserted tablet, having one end of the biasing element attached to the base tablet rear support panel and the other end of the biasing element being attached to the distal tablet rear support panel.

8. A portable computing tablet holster adapted to support a portable computing tablet using one or both hands of a user, the portable computing tablet holster comprising:
a portable computing tablet retention assembly including:
a tablet holster frame rear panel having a first elongate edge, a second elongated edge opposite and parallel to the first elongate edge, a first lateral edge, wherein the first lateral edge extends between like first ends of the first elongate edge and the second elongate edge, a second lateral edge opposite and parallel to the first lateral edge, the second lateral edge extending between like second ends of the first elongate edge and the second elongate edge,
a tablet holster frame first retention channel extending along at least a portion of the first elongate edge,
a tablet holster frame second retention channel extending along at least a portion of the second elongate edge,
each of the first retention channel and the second retention channel being designed to receive and retain a respective edge of the portable computing tablet,
a tablet holster frame end retention feature located proximate the first lateral edge,
a pliant tablet retention feature extending away from a contact surface of the tablet holster frame rear panel, the pliant tablet retention feature being designed to enable passage of the portable computing tablet into the holster and retain the portable computing tablet within the holster during use; and
a handle having an attachment end and a distal, free end, the handle being attached to the tablet holster frame rear panel at the attachment end thereof.

9. A portable computing tablet holster as recited in claim 8, the pliant tablet retention feature further comprising:
a retention nib extending outward from a contacting surface of a cantilevered retention arm at a location distally from a connected end of the cantilevered retention arm.

10. A portable computing tablet holster as recited in claim 8, the pliant tablet retention feature further comprising:
a cantilevered retention arm formed by a pair of slots, each slot extending inward from the respective lateral edge of the tablet holster frame rear panel; and
a retention nib extending outward from a contacting surface of a cantilevered retention arm at a location distally from a connected end of the cantilevered retention arm.

11. A portable computing tablet holster as recited in claim 8, the tablet holster frame end retention feature includes at least one of:
a) a feature extending outward from a distal rear support panel tablet contacting surface of the tablet holster frame rear panel,
b) a tablet holster frame end retention channel extending along at least a portion of the first lateral edge, and
c) at least a second pliant tablet retention feature extending away from the contact surface of the tablet holster frame rear panel, the pliant tablet retention feature being designed to enable passage of the portable computing tablet into the holster and retain the portable computing tablet within the holster during use.

12. A portable computing tablet holster as recited in claim 8, the holster further comprising:
a camera viewing aperture formed through the tablet holster frame rear panel, the camera viewing aperture being located to align with a camera of the portable computing device when the portable computing device is retained by the portable computing tablet retention assembly.

13. A portable computing tablet holster as recited in claim 8, the holster further comprising:
a user input device integrated into the handle.

14. A portable computing tablet holster as recited in claim 8, the holster further comprising:
at least one user input device integrated into the handle, wherein the at least one user input device is adapted to transfer a user's input from the at least one user input device to at least one of the portable computing device, a light emitting device integrated into the portable computing tablet holster, and a camera integrated into the portable computing tablet holster.

15. A portable computing tablet holster as recited in claim 8, the tablet holster frame rear panel segmented into a base tablet rear support panel and a distal tablet rear support panel in a manner to enable distal adjustment between the tablet holster frame first retention channel and the tablet holster frame second retention channel; and
a width controlling mechanism connecting the base tablet rear support panel and the distal tablet rear support panel, the width controlling mechanism adapted to adjust a span between the tablet holster frame first retention channel and the tablet holster frame second retention channel to accommodate different portable computing tablets of different dimensions.

16. A portable computing tablet holster as recited in claim 8, the holster further comprising:
an articulating mechanism assembling the tablet rear support panel and the handle assembly to one another, the articulating mechanism configured to enable at least one of:
a) a sliding motion between the tablet rear support panel and the handle assembly respective to one another, the sliding motion being along an axis that is substantially parallel to a plane defined a viewing surface of the portable computing tablet when installed into the tablet rear support panel,
b) a rotational motion between the tablet rear support panel and the handle assembly respective to one another, the rotational motion being about an axis that is substantially perpendicular to the plane defined the viewing surface of the portable computing tablet when installed into the tablet rear support panel, and
c) a pivotal motion between the tablet rear support panel and the handle assembly respective to one another, the pivotal motion being along an axis that is substantially parallel to a plane defined a viewing surface of the portable computing tablet when installed into the tablet rear support panel and perpendicular to an elongated axis of the handle.

17. A portable computing tablet holster as recited in claim 8, the holster further comprising:
   at least one portable computing tablet holster end slot formed extending inward from a respective lateral edge of the tablet holster frame rear panel, wherein the at least one portable computing tablet holster end slot is adapted to provide access to the portable computing tablet enabling the user to at least one of:
   a) completely insert the portable computing tablet into the portable computing tablet retention assembly, and
   b) aid in an initial removal of the portable computing tablet from the portable computing tablet retention assembly.

18. A portable computing tablet holster as recited in claim 8, the holster further comprising:
   a controller;
   a portable power supply in electrical communication with the controller; and
   at least one of the following in signal communication with the controller:
   a) a wired communication interface,
   b) a wireless communication interface,
   c) at least one connector,
   d) a non-transient digital memory device,
   e) a digital camera, and
   f) a user input device.

19. A portable computing tablet holster adapted to support a portable computing tablet using one or both hands of a user, the portable computing tablet holster comprising:
   a portable computing tablet retention assembly including:
      a tablet holster frame rear panel having a first elongate edge, a second elongated edge opposite and parallel to the first elongate edge, a first lateral edge, wherein the first lateral edge extends between like first ends of the first elongate edge and the second elongate edge, a second lateral edge opposite and parallel to the first lateral edge, the second lateral edge extending between like second ends of the first elongate edge and the second elongate edge,
      a tablet holster frame first retention channel extending along at least a portion of the first elongate edge,
      a tablet holster frame second retention channel extending along at least a portion of the second elongate edge,
      each of the first retention channel and the second retention channel being designed to receive and retain a respective edge of the portable computing tablet, the first retention channel and the second retention channel are arranged facing one another, and
      a tablet holster frame end retention feature located proximate the first lateral edge;
      a pliant tablet retention feature extending away from a contact surface of the tablet holster frame rear panel, the pliant tablet retention feature being designed to enable passage of the portable computing tablet into the holster and retain the portable computing tablet within the holster during use; and
      a handle having an attachment end and a distal, free end, the handle being attached to the tablet holster frame rear panel at the attachment end thereof.

20. A portable computing tablet holster as recited in claim 19, the pliant tablet retention feature further comprising:
   a retention nib extending outward from a contacting surface of a cantilevered retention arm at a location distally from a connected end of the cantilevered retention arm.

21. A portable computing tablet holster as recited in claim 19, the tablet pliant retention feature further comprising:
   a cantilevered retention arm formed by a pair of slots, each slot extending inward from the respective lateral edge of the tablet holster frame rear panel; and
   a retention nib extending outward from a contacting surface of a cantilevered retention arm at a location distally from a connected end of the cantilevered retention arm.

22. A portable computing tablet holster as recited in claim 19, the holster further comprising:
   an articulating mechanism assembling the tablet rear support panel and the handle assembly to one another, the articulating mechanism configured to enable at least one of:
   a) a sliding motion between the tablet rear support panel and the handle assembly respective to one another, the sliding motion being along an axis that is substantially parallel to a plane defined a viewing surface of the portable computing tablet when installed into the tablet rear support panel,
   b) a rotational motion between the tablet rear support panel and the handle assembly respective to one another, the rotational motion being about an axis that is substantially perpendicular to the plane defined the viewing surface of the portable computing tablet when installed into the tablet rear support panel, and
   c) a pivotal motion between the tablet rear support panel and the handle assembly respective to one another, the pivotal motion being along an axis that is substantially parallel to a plane defined a viewing surface of the portable computing tablet when installed into the tablet rear support panel and perpendicular to an elongated axis of the handle.

23. A portable computing tablet holster as recited in claim 19, wherein the tablet holster frame end retention feature is provided in a form of a channel extending along at least a portion of the first lateral edge.

* * * * *